(12) United States Patent
Iwata

(10) Patent No.: US 6,385,201 B1
(45) Date of Patent: May 7, 2002

(54) TOPOLOGY AGGREGATION USING PARAMETER OBTAINED BY INTERNODAL NEGOTIATION

(75) Inventor: Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/069,121

(22) Filed: Apr. 29, 1998

(30) Foreign Application Priority Data

Apr. 30, 1997 (JP) ............................................. 9-126532
Dec. 22, 1997 (JP) ............................................. 9-365607

(51) Int. Cl.[7] ............................................. H04L 12/28
(52) U.S. Cl. ........................ 370/400; 370/255; 709/241
(58) Field of Search ................................. 370/230, 235, 370/237, 238, 252, 253, 395.1, 395.2, 395.21, 395.32, 395.41, 400, 408, 254, 255; 709/241, 242

(56) References Cited

U.S. PATENT DOCUMENTS

| 5,402,478 A | * | 3/1995 | Hluchyj et al. | 370/237 |
| 5,535,195 A | * | 7/1996 | Lee | 370/237 |
| 5,687,168 A | * | 11/1997 | Iwata | 370/400 |
| 5,781,529 A | * | 7/1998 | Liang et al. | 370/237 |
| 5,831,975 A | * | 11/1998 | Chen et al. | 370/256 |
| 5,933,425 A | * | 8/1999 | Iwata | 370/351 |
| 6,122,283 A | * | 9/2000 | Lee | 370/408 |

FOREIGN PATENT DOCUMENTS

JP 09-36873 2/1997

OTHER PUBLICATIONS

The ATM Forum, Technical Committee, Private Network–Network Interface Spcification Version 1.0 (PNNI 1.0), af–pnni–0055.000 Letter Ballot, Mar. 1996, pp. 13–46.

Whay C. Lee, "Topology Aggregation for Hierarchical Routing in ATM Networks", *Computer Communication Review*, vol. 25, No. 2, Apr. 1995, pp. 82–92.

Iwata et al., ATM Routing Algorithms with Multiple QOS Requirements for Multimedia Internetworking, IEICE Trans. Commun., vol. E79–B, No. 8, pp. 999–1007, Aug. 1998.*

* cited by examiner

*Primary Examiner*—Wellington Chin
*Assistant Examiner*—Frank Duong
(74) *Attorney, Agent, or Firm*—Sughrue Mion, PLLC

(57) ABSTRACT

In a hierarchical network, an aggregation parameter is exchanged between a node and its neighbor to agree on a negotiated parameter. A set of physical links between them are aggregated into a logical link according to the negotiated parameter and resource data of the logical link is stored in a database of each node. The resource data is then exchanged between them and the contents of the database of each node are updated with resource data of its neighbor. To optimize the link aggregation, an operating performance of the logical link is evaluated by the node using traffic data from the network, and the negotiated parameter is updated according to the detected operating performance. The updated aggregation parameter of the node is exchanged with its neighbor to agree on a negotiated updated parameter which is used to aggregate the physical links into the logical link.

39 Claims, 16 Drawing Sheets

| | QOS CLASS | | | |
|---|---|---|---|---|
| | A | B | C | D |
| PHYSICAL LINK-1 | $QoS_1$ | $QoS_2$ | | |
| PHYSICAL LINK-2 | $QoS_3$ | | $QoS_4$ | $QoS_5$ |
| PHYSICAL LINK-3 | $QoS_6$ | $QoS_7$ | $QoS_8$ | |
| LOGICAL LINK | $Q_a$ | $Q_b$ | $Q_c$ | $Q_d$ |

$Q_a = r \cdot \max\{QoS_1, QoS_3, QoS_6\} + (1-r) \min\{QoS_1, QoS_3, QoS_6\}$
$Q_b = r \cdot \max\{QoS_2, QoS_7\} + (1-r) \min\{QoS_2, QoS_7\}$
$Q_c = r \cdot \max\{QoS_4, QoS_8\} + (1-r) \min\{QoS_4, QoS_8\}$
$Q_d = r \cdot QoS_5 + (1-r) QoS_5 = QoS_5$

PEER GROUP C

160

161

162

163

164

TOPOLOGY AGGREGATION USING PARAMETER OBTAINED BY INTERNODAL NEGOTIATION

BACKGROUND OF THE INVENTION

1. Field of the Invention

The present invention generally relates to communications networks, and more specifically to aggregation of links between nodes of the same peer group into a logical link and aggregation of the topology of border nodes of a child peer group into a logical star topology.

2. Description of the Related Art

As described in the ATM Forum Private Network-Network Interface Specification Version 1.0, topology aggregation is the notion of reducing nodal as well as link information to achieve scaling in a large network. It is not only motivated by the need for complexity reduction but also to hide the topology internals of peer groups in the interest of security.

However, if topology aggregation is performed by network nodes individually with no regard to their neighbor nodes, all network nodes would provide aggregation with different levels of approximation. Such internodal variability would result in inefficient operation of the network.

SUMMARY OF THE INVENTION

It is therefore an object of the present invention to provide an efficient communication network by using an agreed-upon parameter for topology aggregation.

According to a first aspect of the present invention, there is provided for a communication network a network node which comprises negotiating means for exchanging aggregation parameters with a neighbor node to agree on a negotiated aggregation parameter, link aggregating means for aggregating a plurality of physical links between the network node and a neighbor node into a logical link according to the negotiated aggregation parameter, a database for storing resource data of the logical link, and means for exchanging the resource data with the neighbor node and updating contents of the database with resource data of the neighbor node.

Each of the physical links is represented by a resource vector and its element is represented by a resource value of a different resource class, and the logical link is represented by a resource vector and its element is represented by a sum of a maximum resource value, multiplied by the aggregation parameter, of the elements of the resource vectors of the physical links and a minimum resource value, multiplied by unity minus the aggregation parameter, of the elements of the resource vectors of the physical links.

In order to optimize the link aggregation, the network node preferably further comprises link performance evaluation means for evaluating an operating performance of the logical link by using traffic data from the network, and update means for updating the negotiated aggregation parameter according to the detected operating performance. The negotiating means is arranged to exchange the updated aggregation parameter with the neighbor node to agree on a negotiated updated aggregation parameter and the link aggregating means uses the negotiated updated parameter for aggregating the physical links into the logical link.

According to a second aspect, the present invention provides a peer group leader node of a peer group in a communication network in which a plurality of interconnected nodes are divided into a plurality of peer groups, each peer group having border nodes via which it is interconnected with other peer groups and the peer groups forming a parent peer group. The peer group leader node comprises negotiating means for exchanging aggregation parameters with other peer group leader nodes to agree on negotiated aggregation parameters, topology aggregating means for aggregating physical topology of the border nodes of the peer group into a logical star topology using the negotiated aggregation parameters, a database for storing resource data of the logical star topology, and routing means for exchanging the resource data with a neighbor peer group leader node and updating the database with resource data from the neighbor peer group leader node.

In order to optimize the topology aggregation, the peer group leader node preferably further comprises star topology performance evaluation means for evaluating an operating performance of the star topology by using traffic data from the network, and update means for updating the negotiated aggregation parameters according to the evaluated operating performance. The negotiating means is arranged exchange the updated aggregation parameters with other peer group leader nodes to agree on negotiated updated aggregation parameters, and the topology aggregating means is arranged to aggregate the physical topology using the negotiated updated aggregation parameters.

According to a third aspect, the present invention provides a communication network comprising a plurality of network nodes organized into a plurality of interconnected peer groups, each of the peer groups having a peer group leader node and a plurality of border nodes through which the at least one peer group is connected to other peer groups. Each network node comprises negotiating means for exchanging aggregation parameters with a neighbor node of the same peer group to agree on a negotiated aggregation parameter, link aggregating means for aggregating a plurality of physical links between the network node and a neighbor node into a logical link according to the negotiated aggregation parameter, a database for storing resource data of the logical link, and means for exchanging the resource data with the neighbor node and updating contents of the database with resource data of the neighbor node. Each group leader node comprises negotiating means for exchanging aggregation parameters with other peer group leader nodes to agree on negotiated aggregation parameters, topology aggregating means for aggregating physical topology of the border nodes of the peer group into a logical star topology using the negotiated aggregation parameters, a database for storing resource data of the logical star topology, and routing means for exchanging the resource data with a neighbor peer group leader node and updating the database with resource data from the neighbor peer group leader node.

BRIEF DESCRIPTION OF THE DRAWINGS

The present invention will be described in further detail with reference to the accompanying drawings, in which.

DETAILED DESCRIPTION

Figure 1:
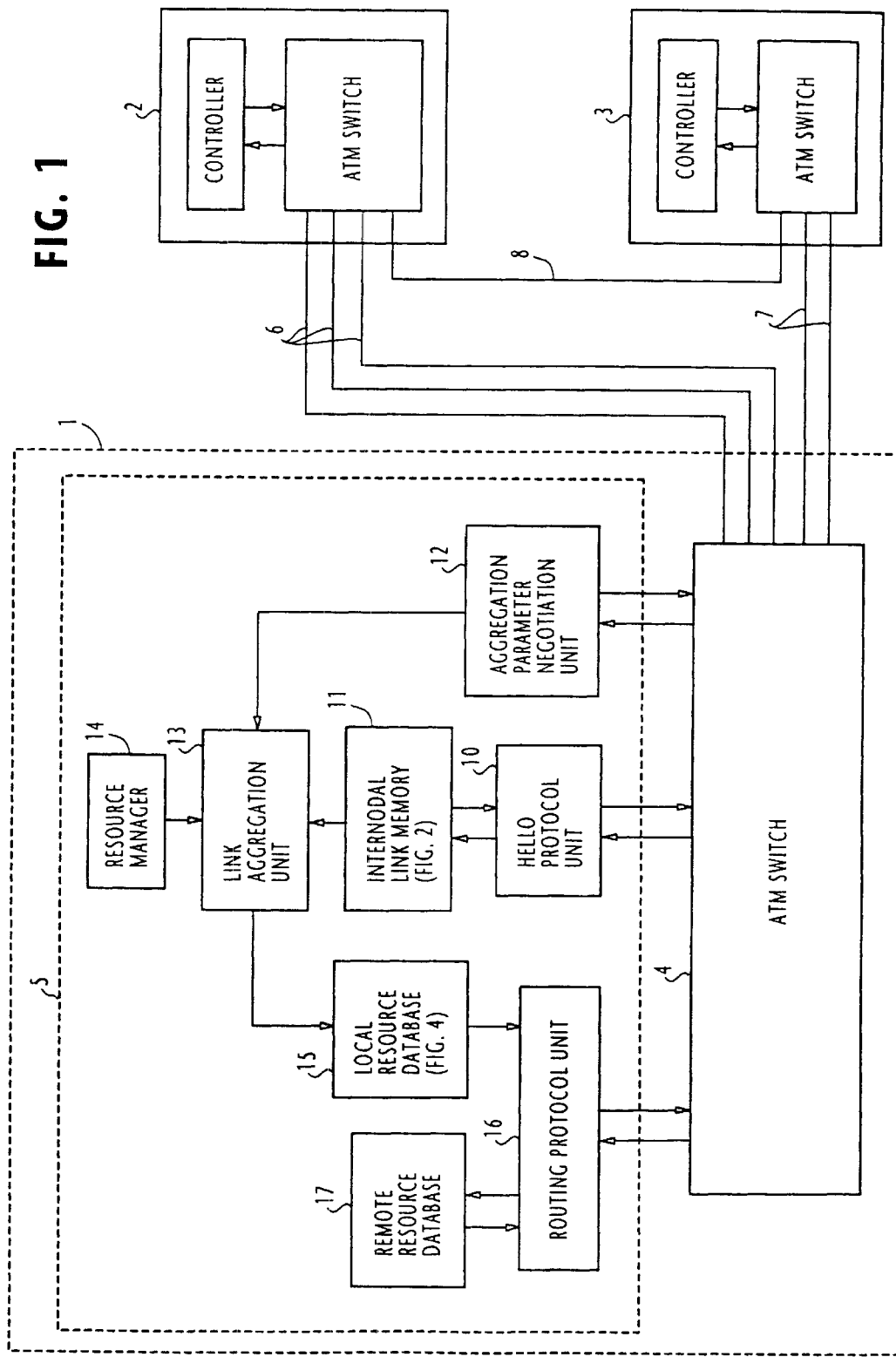
FIG. 1 is a block diagram of a simplified ATM network in which network nodes of a first embodiment of this invention are interconnected by horizontal links to form a single peer group.

Referring now to FIG. 1, there is shown a simplified ATM network according to the present invention, which represents one of a plurality of peer groups. The network comprises ATM nodes 1, 2 and 3 interconnected by physical links. In the illustrated embodiment, nodes 1 and 2 are interconnected by three links 6, nodes 1 and 3 being interconnected by two links 7 and nodes 2 and 3 being interconnected by a single link 8. Each node includes an ATM switch 4 and a microprocessor-based controller 5. In order to implement source routing where the source node is responsible for selecting the path to the destination, the controller 5 first obtains its local knowledge of the network topology by exchanging link state parameters (which describe the characteristics of logical links) with other ATM nodes via the respective ATM switch 4. Nodes in the ATM network are organized into peer groups (domains). Links that connect the members of the same group are "horizontal" links and links that connect two peer groups are "outside" links. Peer groups are organized into different hierarchical levels in parent/child relationship. The ATM nodes shown in FIG. 1 are members of the same peer group.

Figure 2:
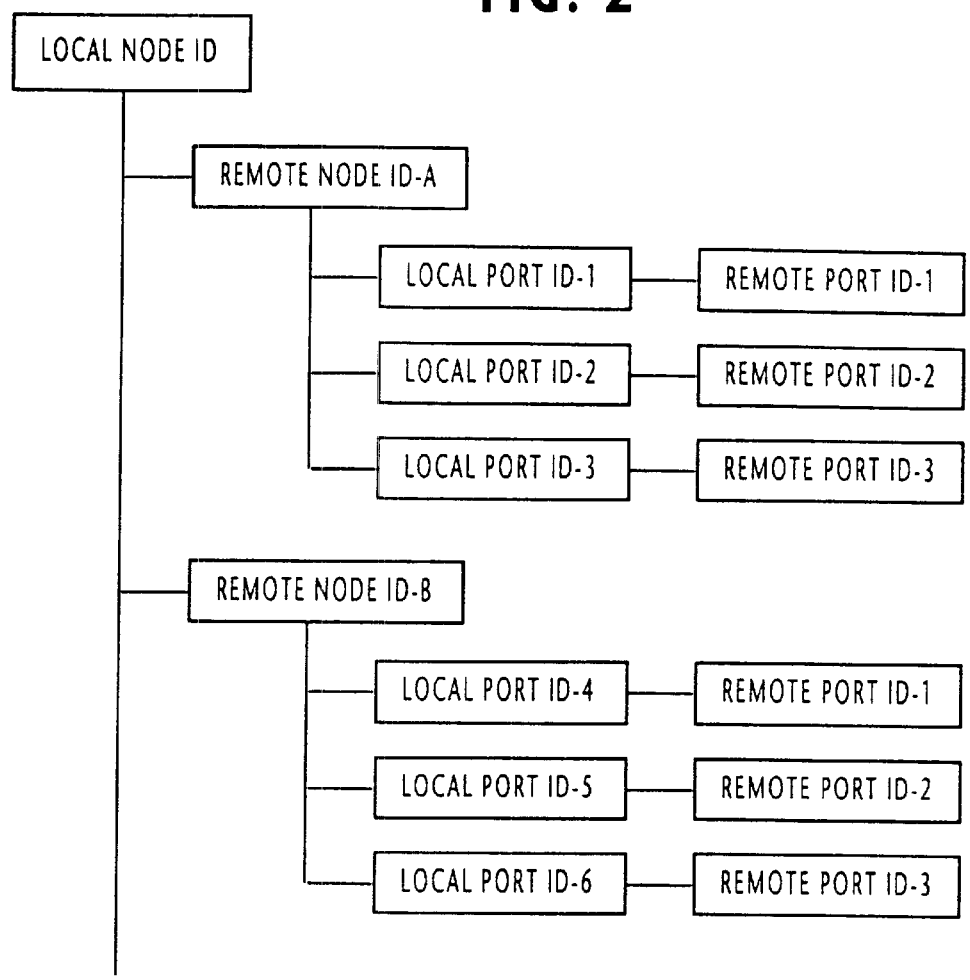
FIG. 2 is an illustration of link information stored in an internodal link memory of an ATM node.

In the ATM network, nodes first discover each other through a PNNI (private network-network interface) hello protocol by exchanging control messages over a horizontal link with their immediate neighbor nodes. The discovery process of each node is performed by a hello protocol unit 10 by sending its own node identifier, port number and peer group identifier. If two neighbors discover that they are within the same peer group by comparison of their peer group identifiers, they exchange their node identifier and their port number to which the horizontal link being used is attached so that each node obtains the remote port number of the horizontal link. If a node has more than one immediate neighbor in the same peer group, the internodal link information of the node may be obtained and stored in an internodal link memory 11 as illustrated in FIG. 2. This hello protocol procedure is performed at regular intervals to update the contents of internodal link memory 11. If two nodes discover each other across an outside link that they have different peer group identifiers, they identify themselves as a border node of the respective peer group and determine that the outside link is an uplink to a parent peer group.

After the hello protocol process is completed, resource vectors of a set of physical links are aggregated (or summarized) into a single resource vector of a single logical link, using an aggregation parameter "r" as a measure of aggregation. The resource vectors are represented by quality of service (QOS) vectors as will be described later. This link aggregation is the process of representing several parallel physical links as a single higher-level (logical) link to a parent peer group.

Figure 3:
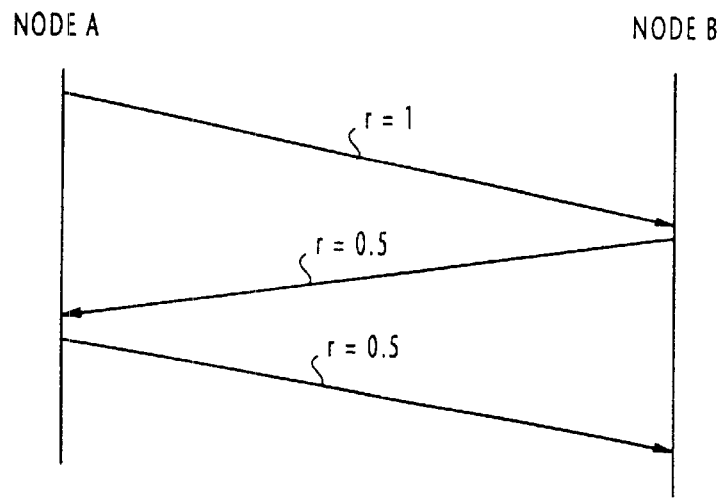
FIG. 3 is a time sequence diagram of control messages exchanged between nodes during an aggregation parameter negotiation process.

This is achieved in three steps. In the first step, an aggregation parameter is obtained through a negotiation process by exchanging default values between immediate nodes through an aggregation parameter negotiation unit 12. The aggregation parameter "r" is in the range between 0 (which is referred to as conservative aggregation) and 1 (which is referred to as aggressive aggregation). One example of this negotiation process is illustrated in FIG. 3. In this example, node A asserts a default value 1, node B asserting a default value 0.5. Node A recognizes that node B has asserted a lower value and concedes to 0.5, while node B, recognizing that it has asserted a lower value, adopts its own value as an agreed-upon parameter. The default values of a node may be determined by the network management personnel of the node by reflecting the various QOS parameters of the links through which the node is connected to its immediate neighbor nodes, and an optimum negotiation algorithm may be determined by the operating policy of the network. In the illustrated example, the algorithm is to choose a lower default value.

In the second step, a link aggregation unit 13 performs a link aggregation of multiple sets of local and remote port numbers of parallel physical links to an immediate neighbor into a single set of local and remote port numbers of a logical link according to network resources (available bandwidths and delays of physical links) stored in a resource manager 24 as shown in FIG. 3.

Figure 4:
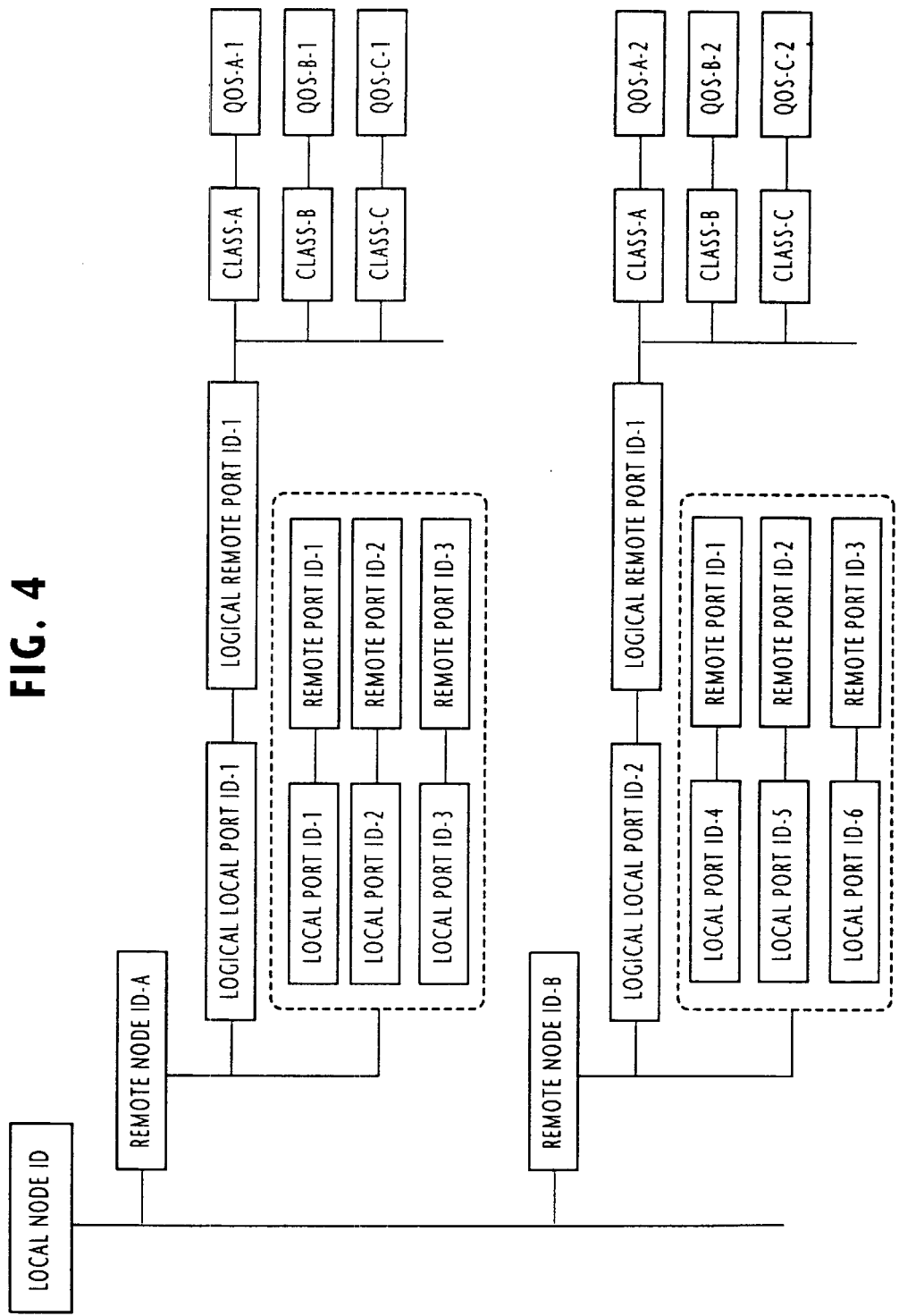
FIG. 4 is an illustration of resource data stored in a local resource database of the ATM node.

In the third step, the link aggregation unit 13 performs a QOS aggregation of the QOS vectors of the physical links into a single QOS vector of a logical link using the negotiated aggregation parameter "r" in a manner to be described below and stores the QOS vectors of logical links (as well as the QOS vectors or physical links) into a local resource database 15, as illustrated in FIG. 4. The link resource information stored in the database 15 is updated at regular intervals with varying resource of the node by the resource manager 14.

Several classes of QOS metric values are defined as network resources in the ATM networking technology.

These are non-additive metrics such as maximum cell rate (constant bit rate) and available cell rate (real-time variable bit race), and additive metrics such as cell delay variation (non real time variable bit race), cell transfer delay (available bit rate), cell loss ratio (unspecified bit rate) and administrative weight. If the aggregation of a set of physical links is aggressive (i.e., r=1), a maximum non-additive metric value and a minimum additive metric value are used, and if the aggregation is conservative (i.e., r=0), a minimum non-additive metric value and a maximum additive metric value are used. However, in practical applications, an intermediate value between 1 and 0 is used as an aggregation parameter.

Figures 5, 6:
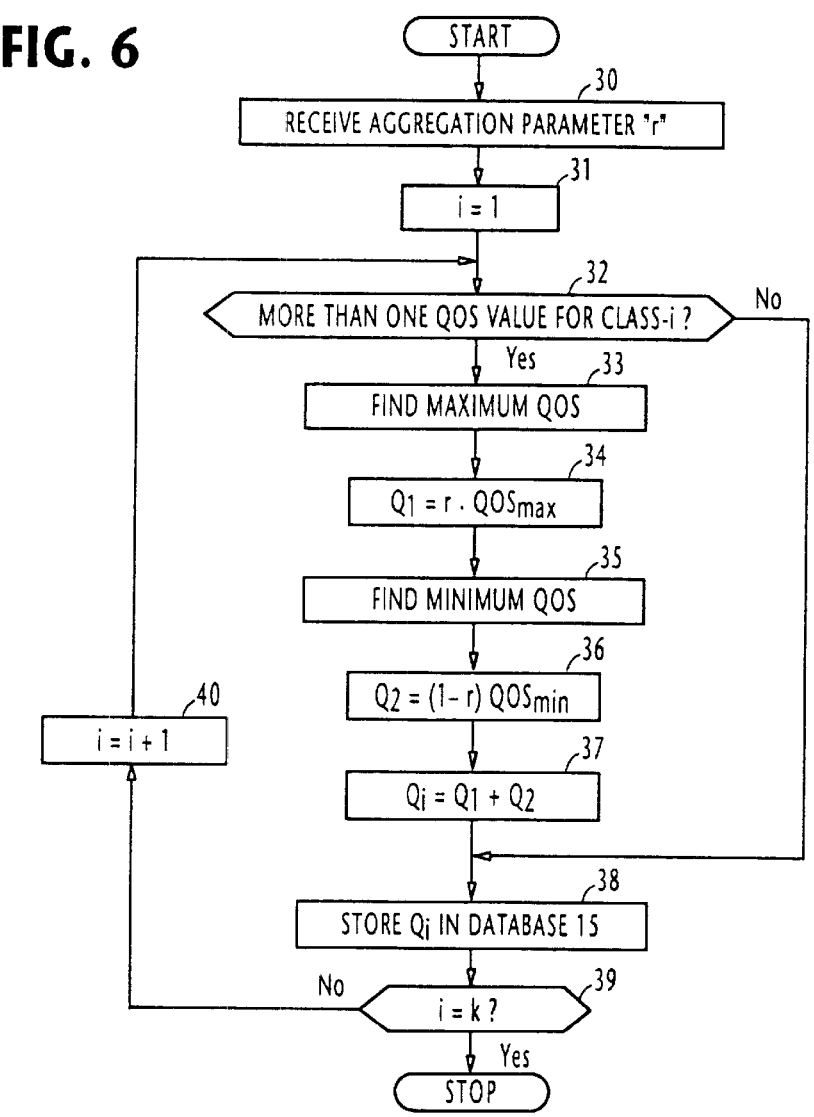
FIG. 5 is an illustration of physical links mapped to QOS (quality of service) parameters of different QOS classes, and aggregated QOS parameters of a logical link into which the physical links are aggregated.
FIG. 6 is a flowchart of the operation of the link aggregation unit of FIG. 1.

The aggregation process begins with the mapping of physical links 1, 2, 3 to QOS metrics $QOS_1$ to $QOS_8$ of classes A, B, C and D, for example, in an aggregation table 20 as shown in FIG. 5. The aggregation process then proceeds to determine the metrics of the different QOS classes for a logical link to which the physical links are to be aggregated. In the case of FIG. 5, the QOS metric values are aggregated as follows to obtain a resource vector ($Q_a$, $Q_b$, $Q_c$, $Q_d$) for the logical link, where, $Q_a = r \cdot \max\{QOS_1, QOS_3, QOS_6\} + (1-r)\min\{QOS_1, QOS_3, QOS_6\}$ $Q_b = r \cdot \max\{QOS_2, QOS_7\} + (1-r)\min\{QOS_2, QOS_7\}$ $Q_c = r \cdot \max\{QOS_4, QOS_8\} + (1-r)\min\{QOS_4, QOS_8\}$ $Q_d = r \cdot QOS_5 + (1-r)QOS_5 = QOS_5$ The flowchart of FIG. 6 illustrates the QOS aggregation process. The process begins with reception of the aggregation parameter "r" from the negotiation unit 12 (step 30). A QOS-class identifying variable "i" is set to 1 (step 31) and a search is made through the aggregation table 20 to determine whether there is more than one class-i QOS metric for a set of physical links (step 32). If the decision is affirmative at step 42, flow proceeds to step 33 to find a maximum value of the class-i QOS metrics and multiplies it with the parameter "r" to produce $Q_1$ at step 34. At step 35, a minimum value of the class-i QOS metrics is determined, and at step 36, it is multiplied with (1−r) to produce $Q_2$. At step 37, $Q_1$ and $Q_2$ are summed to produce an aggregated QOS metric $Q_i$ for class "i", which is stored in the aggregation table 20 (step 39). Flow proceeds to step 40 to check to see if i is equal to k (where k is the maximum number of QOS classes). If i is smaller than k, flow proceeds to step 31 to increment the variable i by one and returns to step 32 to repeat the same process on the next QOS class. If the decision at step 32 is negative, flow proceeds to step 38, skipping steps 33 to 37. When the aggregation process is performed on all the QOS classes, i becomes equal to k at step 40 and the routine is terminated.

In this way, four aggregated QOS metrics $Q_a$, $Q_b$, $Q_c$ and $Q_d$ are derived and stored in the respective classes of the logical link entry of aggregation table 20, as illustrated. Therefore, if QOS-1, QOS-3 and QOS-6 in the class A of table 20 are maximum cell rates of 155 Mbps, 155 Mbps and 100 Mbps, respectively, and the negotiated parameter "r" is 0.5, the aggregated QOS metric of the class A is equal to 127.5 Mbps (=0.5×155+0.5×100).

A routing protocol unit 16 monitors the contents of the local resource database 15 to determine whether there is an update in any of the aggregated QOS values which exceeds a predefined threshold. Thus, when the database 15 is initially created or when there is a significant amount of updates in the local resource database 15, each node uses its routing protocol unit 16 to advertise its current topology information to other nodes. The routing protocol unit 16 also receives topology information from other nodes and builds a remote resource database 17, and uses the contents of local and remote resource databases 15 and 17 to provide route calculations.

Figure 7:
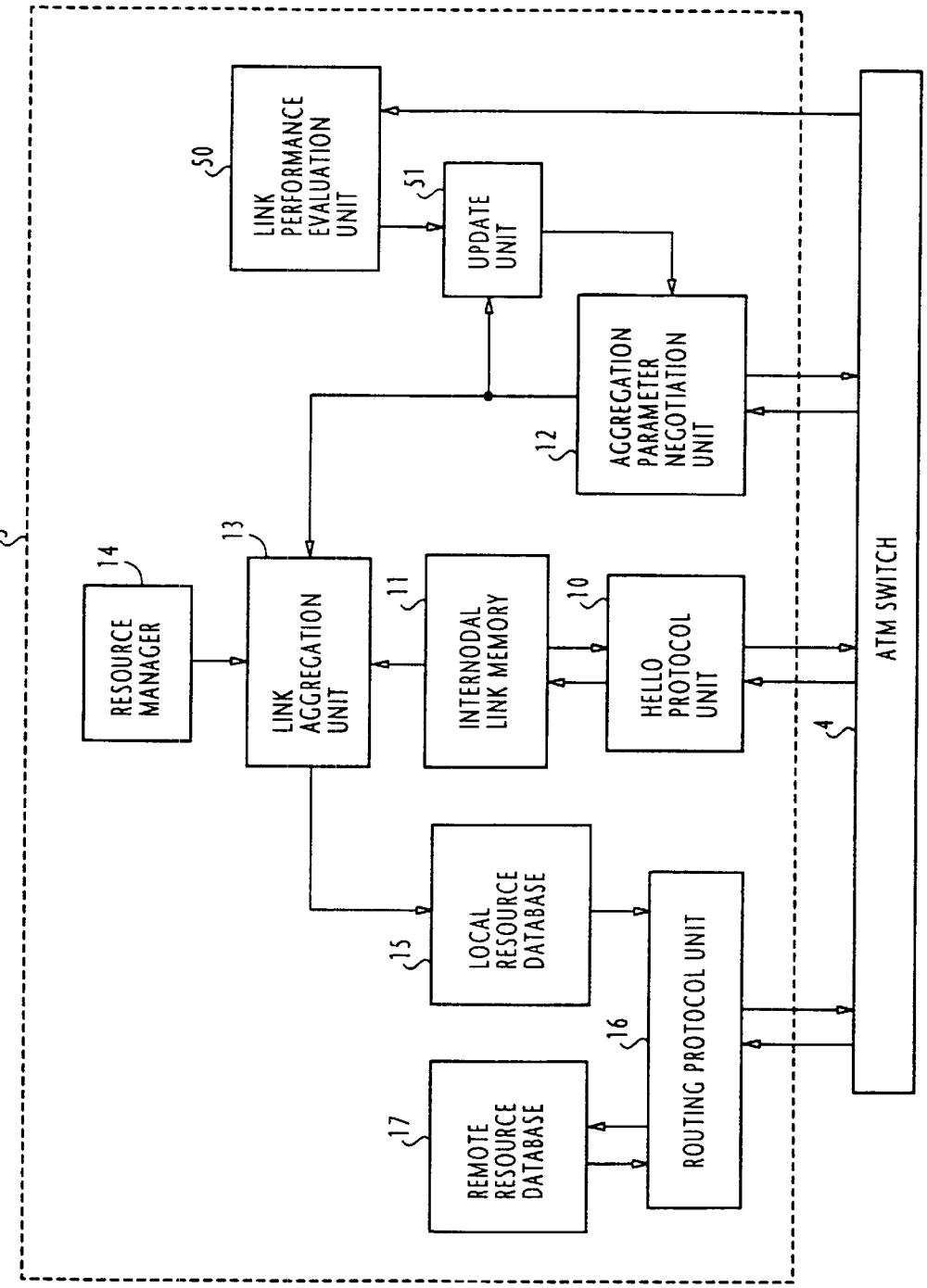
FIG. 7 is a block diagram of an ATM node according to a second embodiment of the present invention.
Figure 8:
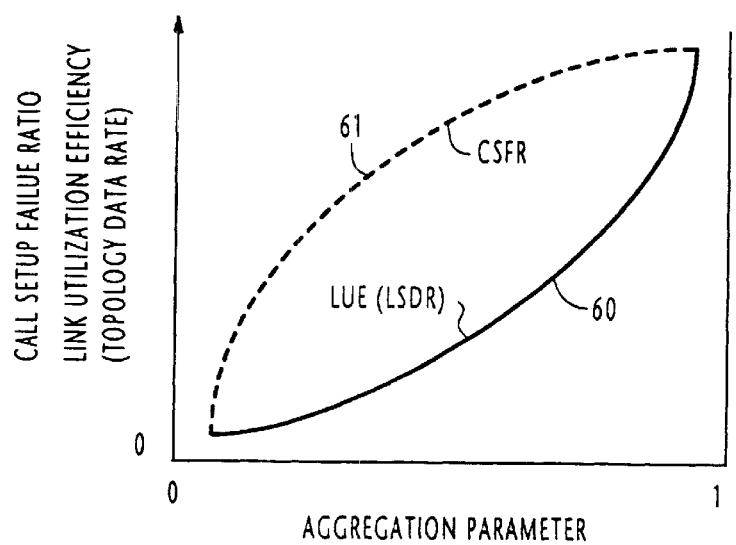
FIG. 8 is a graphic representation of link performance (call setup failure rate, link utilization efficiency and topology data rate) plotted against aggregation parameter.

Controller 5 is modified as shown in FIG. 7. This modification differs from the previous embodiment in that the controller 5 additionally includes a link performance evaluation unit 50 and an aggregation parameter update unit 51. Link performance evaluation unit 50 is connected to the ATM switch to collect traffic data of a logical link from the network and calculates the call setup failure ratio and utilization efficiency of the logical link at regular intervals to evaluate the performance of the logical link. Parameter update unit 51 updates the aggregation parameter "r" if the evaluated performance does not satisfy predefined conditions. As illustrated in FIG. 8, computer simulations show that the call setup failure ratio and utilization efficiency of a logical link have mutually conflicting characteristics as indicated by curves 60 and 61 as a function of aggregation parameter "r" in the range between 0 (conservative value) and 1 (aggressive value). Therefore, if the calculated call setup failure ratio is higher than some critical value, the update unit 51 decrements the parameter "r" by a predetermined amount and if the calculated utilization efficiency is lower than some critical value it increments the parameter by a predetermined amount.

Aggregation parameter update unit 51 supplies the updated aggregation parameter via the negotiation unit 12 to the remote node. If two nodes have been settled on an aggregation parameter of 0.5 and the local node updates its parameter to 0.2 and informs the remote node of the new value. If the same negotiation algorithm is used as described previously, the remote node agrees to the new value and informs the local node of its agreement to the new parameter 0.2.

The negotiation unit 12 feeds the new aggregation parameter to the aggregation unit 13 to cause it to recalculate the QOS values of the logical link stored in the local resource database 15.

Routing unit 16 monitors the contents of the local resource database 15 and advertises the updated QOS values by flooding control messages across the network if the degree of updates exceeds some predefined value.

The updated QOS values will then be reflected on the operating performance of the local link, and the altered link performance is measured by the link performance evaluation unit 50. Thus, a closed-loop feedback control is established and the QOS values of the logical link are converged to optimum values.

Computer simulations further indicate that the quantity of logical link state information received by control messages flooded across the network during a unit time interval varies as a function of the aggregation parameter. For this reason, the link performance evaluation unit 50 monitors the flooded control messages received from neighbor nodes and calculates the amount of logical link state information generated during a unit time interval. Aggregation parameter update unit 51 determines whether the topology data rate is within the range of upper and lower limits. If it is higher than the upper limit, the update unit 51 decrements the aggregation parameter, and if it is lower than the lower limit, the update unit increments the parameter.

In the foregoing description, physical links are aggregated into a single logical link. The description that follows is concerned with an embodiment in which physical links are aggregated into more than one logical link.

Figure 10:
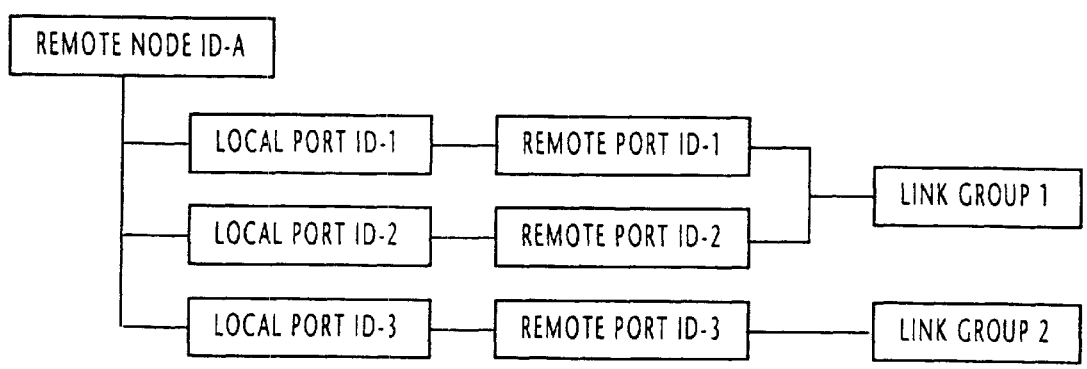
FIG. 10 is an illustration of link group data stored in the link group memory of FIG. 9.
Figure 9:
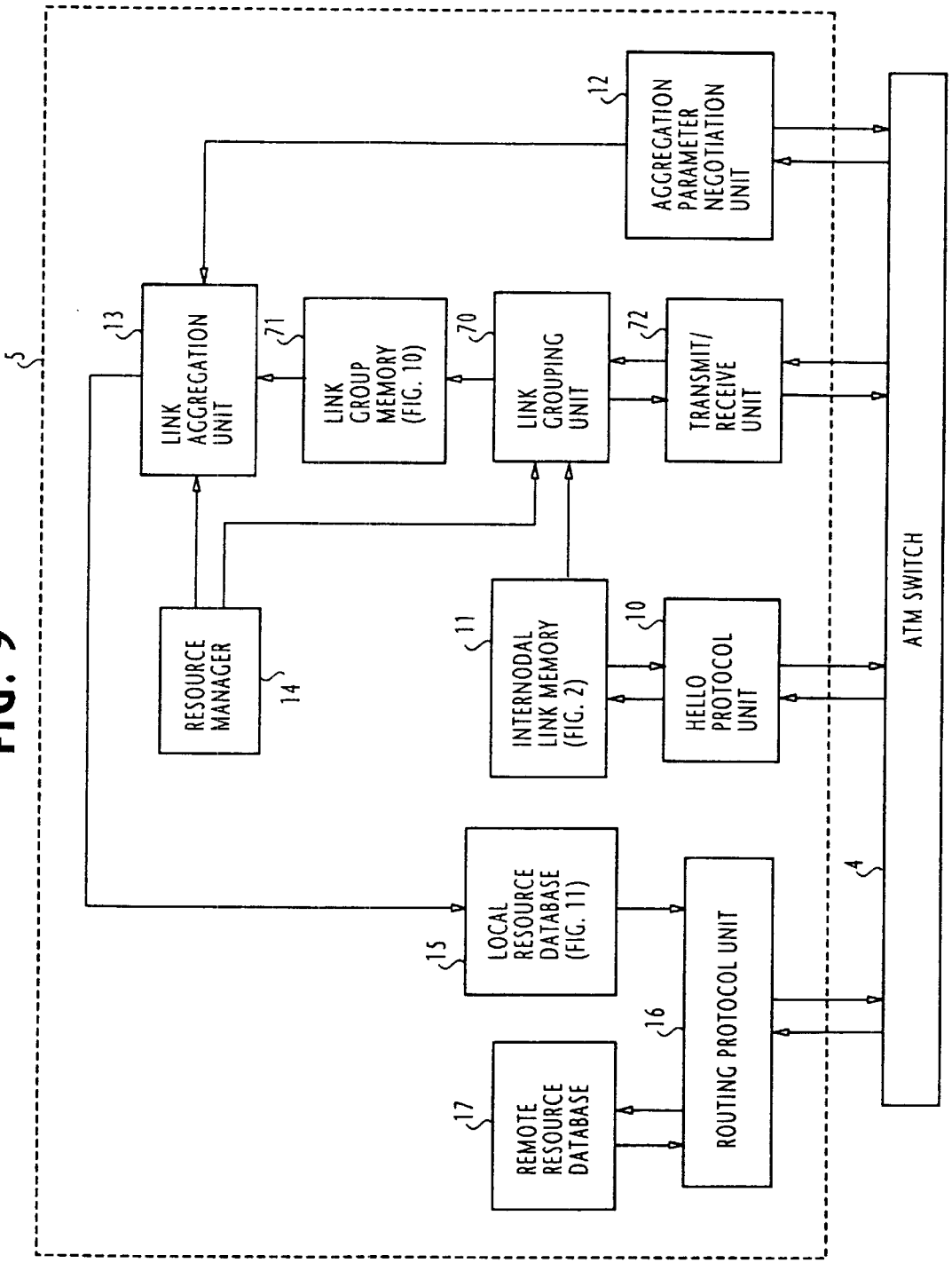
FIG. 9 is a block diagram of an ATM node according to a third embodiment of the present invention.

FIG. 9 illustrates a modified controller of the present invention in which physical links are aggregated into more than one logical link and in which like parts are numbered with the same numerals as used in the previous embodiment. In FIG. 9, a link grouping unit 70 is connected to the internodal link memory 11 and the resource manager 14 to group a set of physical links into one or more groups of logical links. If the local node has a greater value of node identifier than that of a remote node to which the physical links are connected, the link grouping unit 70 of the local node has the right to initiate the link grouping by identifying the internodal link information (FIG. 2) of memory 11 according to similarities of the link attributes managed by the resource manager 14. The degrees of similarities between physical links are determined on the basis of whether these links support same QOS classes and/or similar QOS values. Link grouping unit segments the physical links into a plurality of logical links, appends unique link group identifiers to the logical links, respectively, to produce link grouping data. This grouping data is transmitted via a transmit/receive unit 72 to the remote node. When the link grouping unit 70 produces link grouping data itself or receives it from the remote node, it organizes the local and remote port numbers of the physical links into groups as shown in FIG. 10 in a link group memory 71.

Figure 11:
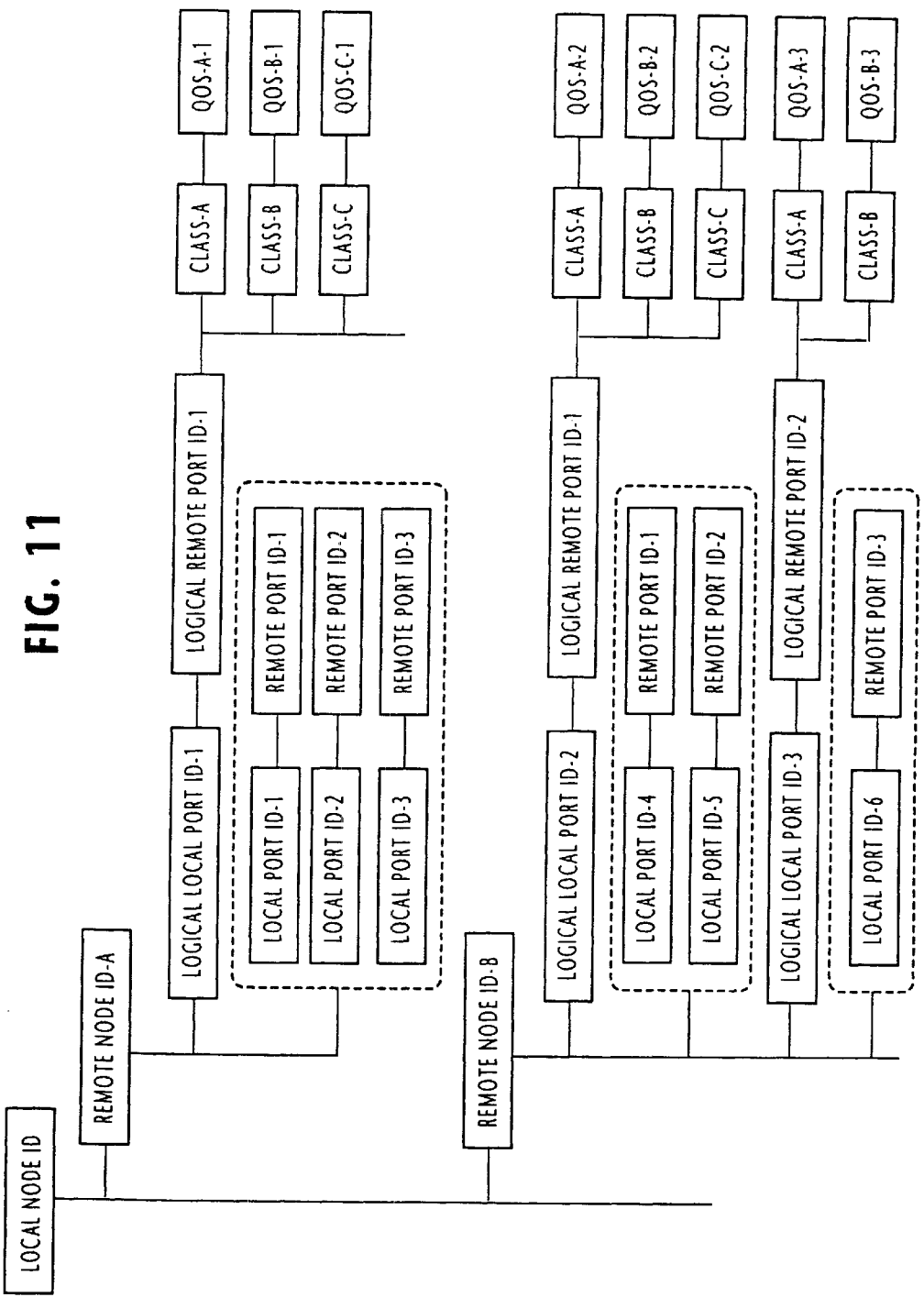
FIG. 11 is an illustration of resource data stored in the local resource database of FIG. 9.

The information stored in link group memory 71 is used by the link aggregation unit 13 to perform a link aggregation process on each group of logical links. In this embodiment, the aggregation parameter "r" is produced for each logical link group by negotiation unit 12. Link aggregation unit 13 provides the link aggregation process of each logical link group using the aggregation parameter of this group and produces link state data as shown in FIG. 11 to be stored in the local resource database 15.

Figure 12:
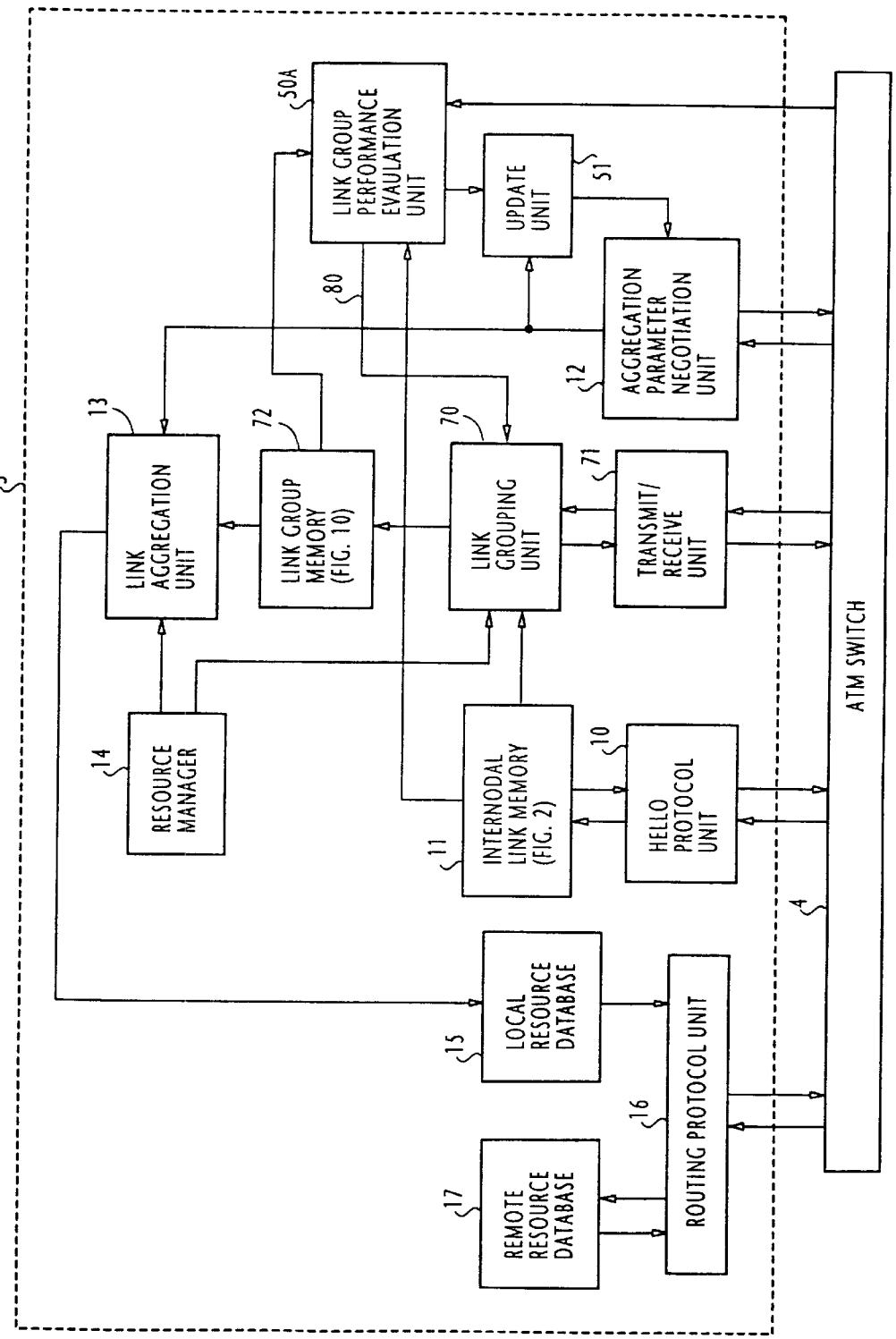
FIG. 12 is a block diagram of an ATM node according to a fourth embodiment of the present invention.

The link grouping and feedback control features of FIGS. 7 and 9 are combined as illustrated in FIG. 12. Link group performance evaluation unit 50A collects traffic data from the network and identifies the physical links of each group using the port number data stored in memories 11 and 72 and calculates the call setup failure ratio, utilization efficiency and topology data rate of the physical links of each group. A connection 80 is provided from the link group performance evaluation unit 50A to the link grouping unit 70 to reflect the evaluated link group performance in the grouping process of unit 70. As a result, physical links are adaptively converged into optimal groups according to the performance of each link group.

While the foregoing description is concerned with the operation of ATM nodes of the same peer group, the description that follows is concerned with the operation of ATM nodes between different peer groups interconnected by outside links.

Figure 13:
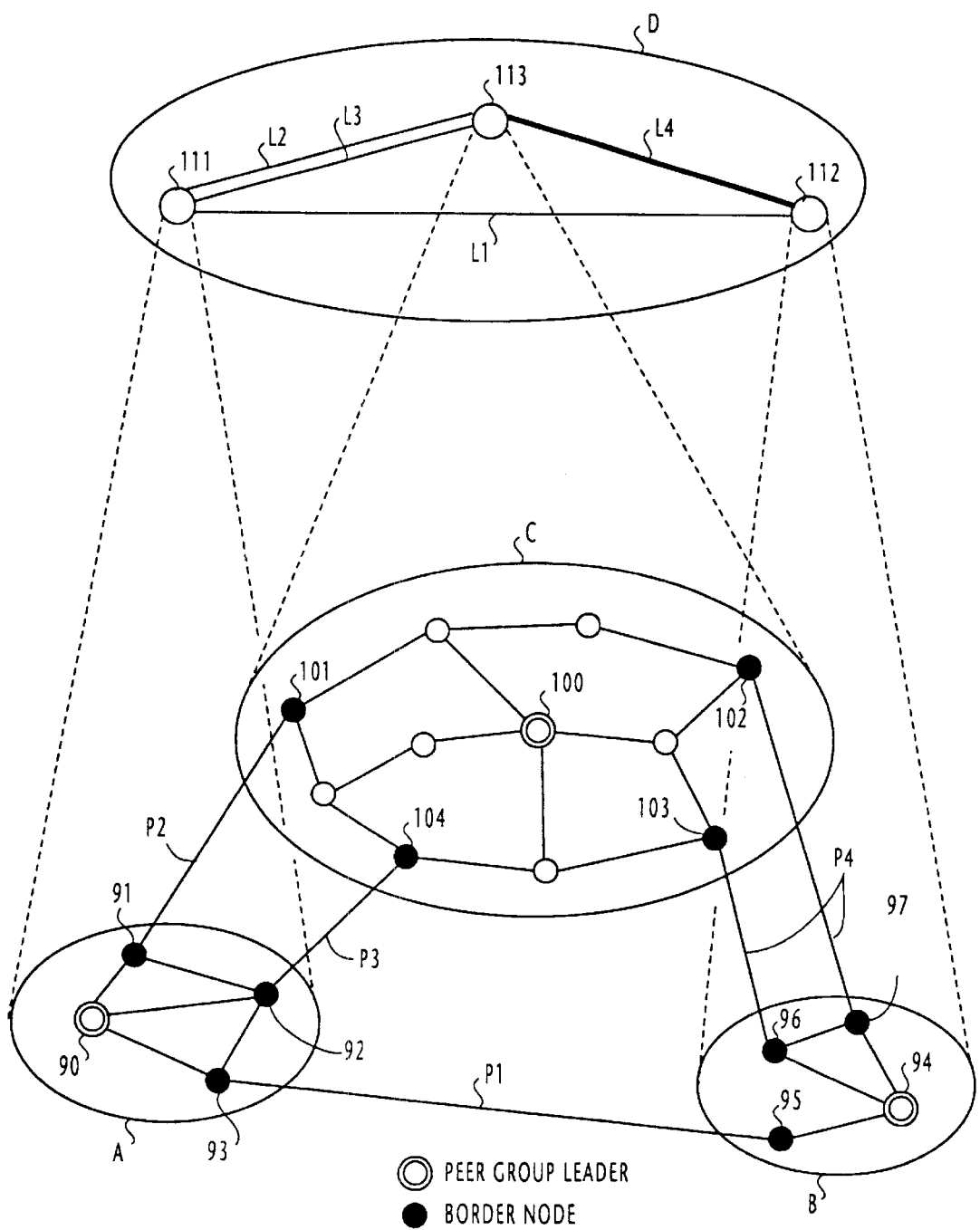
FIG. 13 is a block diagram of an ATM network in which network nodes are organized into hierarchical levels of lower (physical), child peer groups and a higher (logical), parent peer group.

FIG. 13 shows a plurality of ATM nodes organized into peer groups A, B and C having peer group leaders 90, 94 and 100, respectively. These peer groups represent a physical layer and are child peer groups of a common, parent (logical) peer group D representing a logical layer. In the parent peer group D, child peer groups A, B and C are represented by logical nodes 111, 112 and 113, respectively. As an example, peer groups A and B are interconnected by a physical link P1 between border nodes 93 and 95 and this physical link is represented in the parent peer group D as a logical link L1. Peer groups A and C are interconnected by physical links P2 and P3 which are represented as logical links L2 and L3 in the parent peer group D, respectively, and nodes 91 and 92 are the border nodes in peer group A that are connected by links P2 and P3 to border nodes 101 and 104 of peer group C. Likewise, peer groups B and C are interconnected by two physical links P4 which are aggregated into and represented by a single logical link L4 in the parent peer group D, and nodes 96 and 97 are the border nodes in peer group B that are connected by links P4 to border nodes 102 and 103 of peer group C.

Each peer group leader has responsibilities to aggregate nodal and link topology data of its own peer group, exchange the aggregated topology data with the logical nodes of the parent peer group over virtual channels and advertise its topology data to all the child peer groups. Briefly described, each peer group leader first approximates a symmetrical star (template) topology by interconnecting its border nodes in a configuration having a nucleus at the center and links (spokes) emanating from the nucleus to ports where the physical links of the peer group are attached, aggregates physical links, and then eliminates one or more spokes where corresponding physical links are aggregated.

Figure 14:
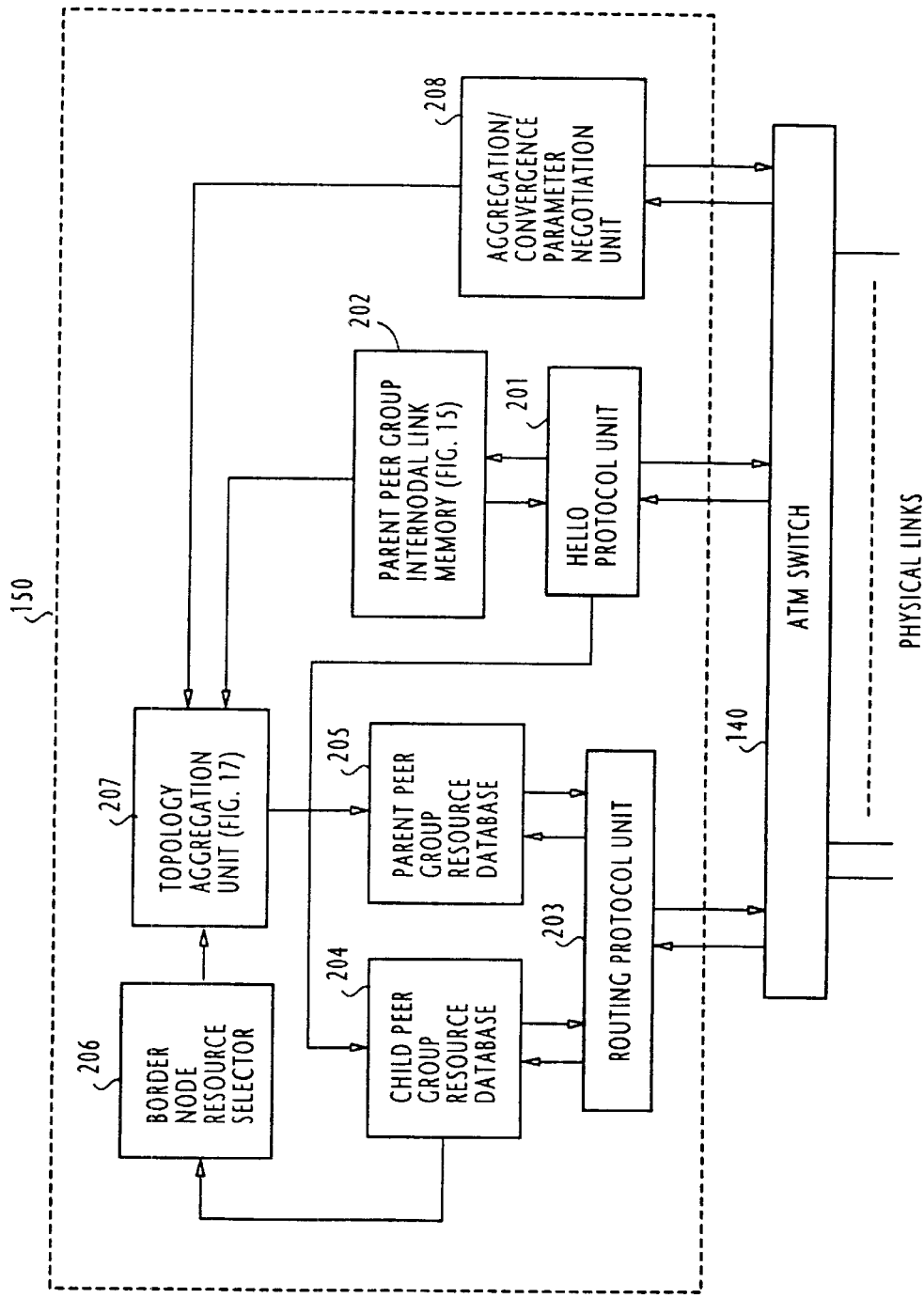
FIG. 14 is a block diagram of an ATM node operating as a peer group leader of the network of FIG. 13.

Details of the peer group leaders 90, 94 and 100 are illustrated in FIG. 14. Each peer group leader includes an ATM switch 140 and a microprocessor-based controller 150. Controller 150 comprises a hello protocol unit 201 connected to the ATM switch 140. Hello protocol unit 201 exchanges a control message with immediate neighbor nodes of the same peer group as well as with those in the parent peer group to collect nodal and link topology data. The control message of the peer group leader includes a plurality of fields containing a local node, a local port number, a local peer group identifier, the number of logical links between peer groups, logical link group identifier, a local logical port number, a local border node identifier, and a local border port number. A physical link (horizontal ink) between nodes of the same child peer group is represented by the local and remote node identifiers, the local and remote port numbers and the peer group identifier (domain identifier), and a physical link (outside link) between peer groups is represented by the logical link group identifier, the local and remote logical port numbers, the local and remote border node identifiers, and the local and remote border port identifiers. When the peer group leader establishes a virtual channel to a remote node, it fills the local port identifier field of the control message with a predefined bit pattern.

Figure 15:
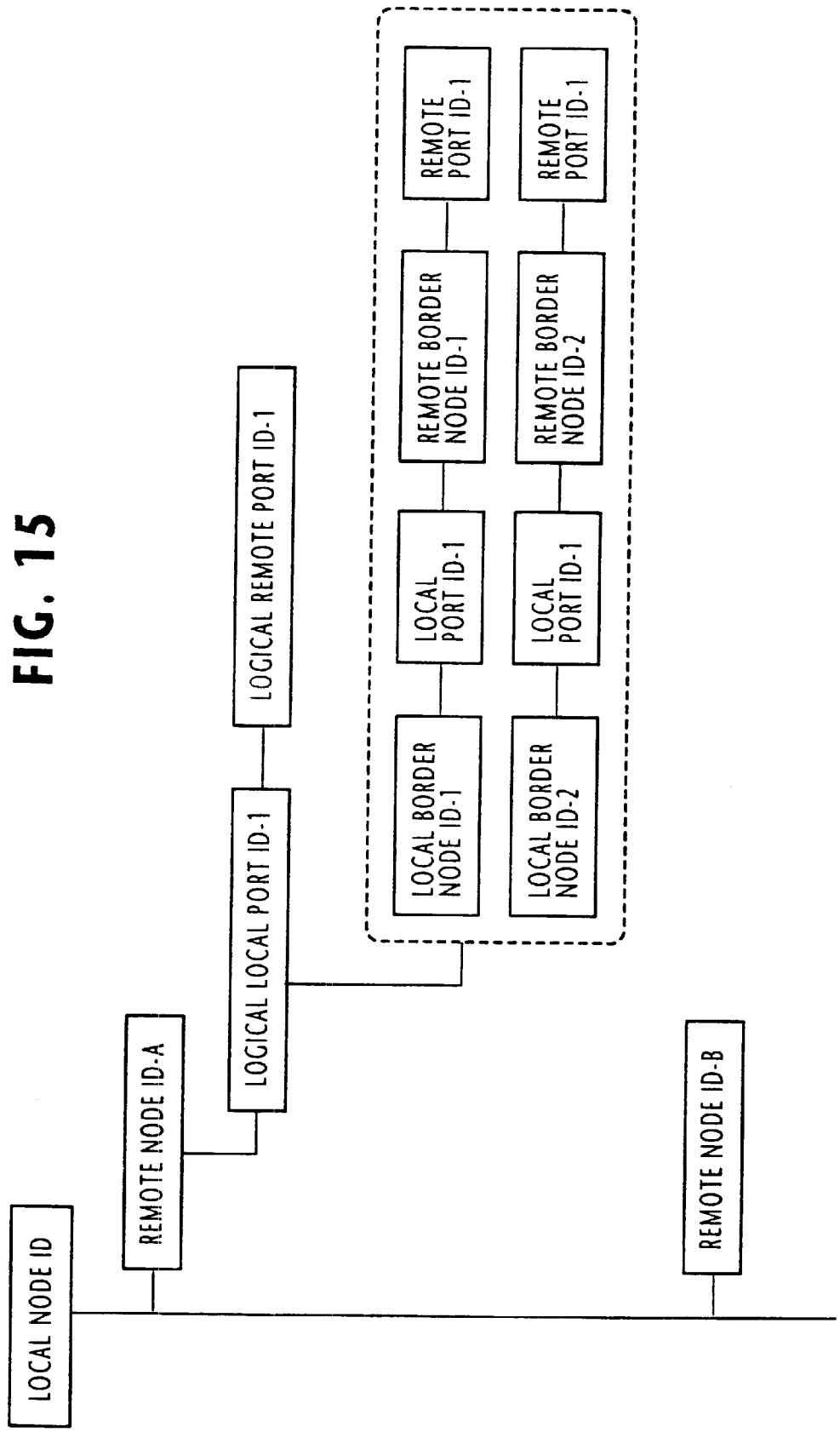
FIG. 15 is an illustration of link information stored in the parent peer group internodal link memory of FIG. 14.

When the hello protocol unit 201 has collected topology data from all immediate neighbor nodes of the same child peer group, it stores the collected data into a child peer group resource database 204. The information collected in this way is similar to that obtained by the hello protocol unit of the previous embodiment. When the hello protocol unit 201 has collected topology data from all the immediate neighbor nodes of the parent peer group, it stores the collected data into a parent peer group internodal link memory 202 in a format as shown in FIG. 15.

On the other hand, a routing protocol unit 203 exchanges topology data with the rest of the network to collect topology data from nodes other than all the immediate neighbor nodes of the peer group leader and stores the topology data of the child peer groups into the child peer group resource database 204 and the topology data of the parent peer group into a parent peer group resource database 205. By using the contents of child and parent peer group resource databases 204 and 205, the routing protocol unit 203 provides route calculations. A resource selector 206 is connected to the child peer group resource database 204 to select the resource data of the border nodes of its own peer group and feeds it to a topology aggregation unit 207.

Figure 16A:
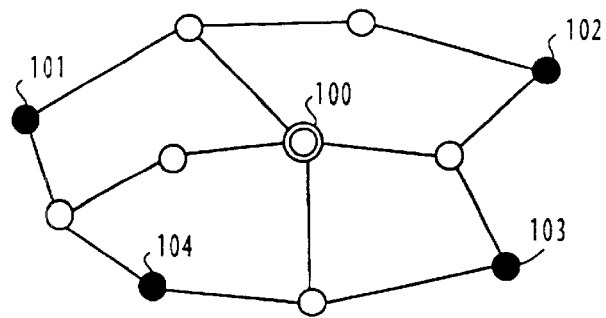
FIGS. 16A to 16F are illustrations of topologies of border nodes evolved in stages from a physical network to a logical network where links and nodes are aggregated by the topology aggregation unit of FIG. 14.

Topology aggregation unit 207 performs aggregation of the topology data concerning the border nodes of its own peer group in two steps. In the first step, a least cost route is determined for all possible combinations of the border nodes and then their topology is transformed into an intermediate form such as mesh topology. If two least cost routes exist between any two border nodes, the QOS parameters may be taken into account to choose one of the routes as a least cost route. Topology aggregation unit 207 of peer group leader 100, for example, transforms the topology of its border nodes 101, 102, 103 and 104 of parent peer group C as represented in FIG. 16A into a meshed topology 160 of FIG. 16B, in which border nodes 101, 102, 103 and 104 are represented by ports A1, A2, A3 and A4 of the logical node 113 of FIG. 14 and shown interconnected by links with minimum link costs $c_{ij}$, where "i" and "j" of a link cost indicate the border nodes between which the link is attached. Meshed topology 160 is then transformed into a symmetrical star topology 161 (FIG. 16D) with spokes of equal length (which represents aggregation parameter) "r" from the nucleus N to the respective ports 101 to 104.

Topology aggregation unit 207 then attempts to determine an aggregation parameter vector $\vec{r}_i$ with a "conservative" approach by solving the following equations for both non-additive QOS metrics and additive QOS metrics:

$$Min\{\vec{r}_i(MCR), \vec{r}_j(MCR)\} \leq \vec{c}_{ij}(MCR) \quad (1a)$$

$$Min\{\vec{r}_i(ACR), \vec{r}_j(ACR)\} \leq \vec{c}_{ij}(ACR) \quad (1b)$$

$$(\vec{r}_i(CLR) + \vec{r}_j(CLR)) \geq \vec{c}_{ij}(CLR) \quad (1c)$$

$$(\vec{r}_i(CDV) + \vec{r}_j(CDV)) \geq \vec{c}_{ij}(CDV) \quad (1d)$$

$$(\vec{r}_i(CTD) + \vec{r}_j(CTD)) \geq \vec{c}_{ij}(CTD) \quad (1e)$$

where MCR=maximum cell rate,
ACR=available cell rate,
CLR=cell loss race,
CDV=cell delay variation, and
CTD=cell transfer delay.

The aggregation parameter vector may also be obtained with an "aggressive" approach by solving the following equations:

$$Min\{\vec{r}_i(MCR), \vec{r}_j(MCR)\} \geq \vec{c}_{ij}(MCR) \quad (2a)$$

$$Min\{\vec{r}_i(ACR), \vec{r}_j(ACR)\} \geq \vec{c}_{ij}(ACR) \quad (2b)$$

$$(\vec{r}_i(CLR) + \vec{r}_j(CLR)) \leq \vec{c}_{ij}(CLR) \quad (2c)$$

$$(\vec{r}_i(CDV) + \vec{r}_j(CDV)) \leq \vec{c}_{ij}(CDV) \quad (2d)$$

$$(\vec{r}_i(CTD) + \vec{r}_j(CTD)) \leq \vec{c}_{ij}(CTD) \quad (2e)$$

Equations (1a) to (1e) can be simplified as follows:

$$\vec{r}_i(MCR) = Min\{\vec{c}_{ij}(MCR)\}, j=0,1,2,\ldots \quad (3a)$$

$$\vec{r}_i(ACR) = Min\{\vec{c}_{ij}(ACR)\}, j=0,1,2,\ldots \quad (3b)$$

Min=x subject to the following constraints:

$$(\vec{r}_i(CLR) + \vec{r}_j(CLR)) \geq \vec{c}_{ij}(CLR), i,j=0,1,2,\ldots \quad (4a)$$

$$(\vec{r}_i(CLR) + \vec{r}_j(CLR)) - \vec{c}_{ij}(CLR) \geq x, i,j=0,1,2,\ldots \quad (4b)$$

Min=y subject to the following constraints:

$$(\vec{r}_i(CTD) + \vec{r}_j(CTD)) \geq \vec{c}_{ij}(CTD), i,j=0,1,2,\ldots \quad (4c)$$

$$(\vec{r}_i(CTD) + \vec{r}_j(CTD)) - \vec{c}_{ij}(CTD) \geq y, i,j=0,1,2,\ldots \quad (4d)$$

Min=z subject to the following constraints:

$$(\vec{r}_i(CLR) + \vec{r}_j(CLR)) \geq \vec{c}_{ij}(CLR), i,j=0,1,2,\ldots \quad (4e)$$

$$(\vec{r}_i(CLR) + \vec{r}_j(CLR)) - \vec{c}_{ij}(CLR) \geq z, i,j=0,1,2,\ldots \quad (4f)$$

It is seen that, if maximum cell rate and available cell rate are used as non-additive QOS metrics, the aggregation parameter "$r_i$" can be obtained by finding the minimum link cost $c_{ij}$ (i=constant, j=1, 2, ...) as given by equations (3a) and (3b). If additive QOS metrics (cell loss rate, cell transfer delay, cell delay variation, administrative weight) are employed for aggregation, the aggregation parameter can be determined by the linear programming method as given by equations (4a) to (4f).

The advantage of using the mesh topology as an intermediate step is that it significantly reduces the amount of computations which would otherwise be required if the original physical topology were directly converted to the star topology.

Figure 17:
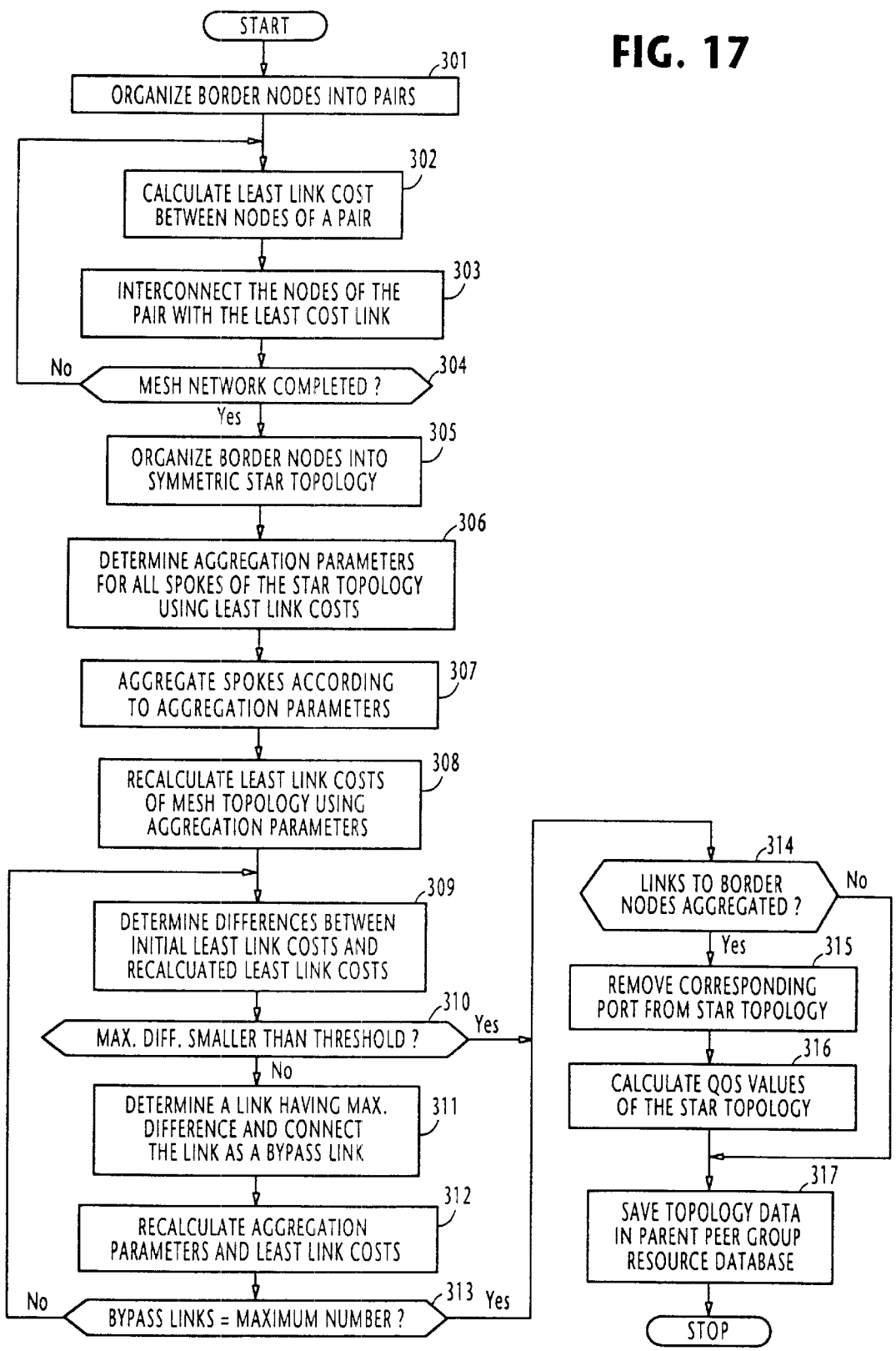
FIG. 17 is a flowchart of the operation of the topology aggregation unit.

For a full understanding of the operation of topology aggregation unit 207, reference is made to the flowchart of FIG. 17.

The border nodes of a child peer group are initially organized into pairs (step 301) and least link costs $c_{ij}$ are calculated between the nodes of each pair (step 302) as described above, and these nodes are interconnected by the least cost link (step 303). Steps 302 and 303 are repeated until a mesh network topology 160 is formed by the border nodes as illustrated in FIG. 16B (step 304).

Figure 16B:
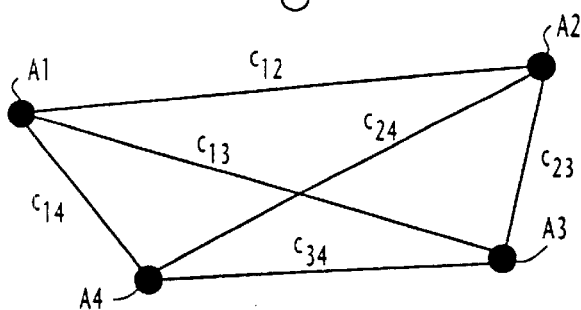
Figure 16C:
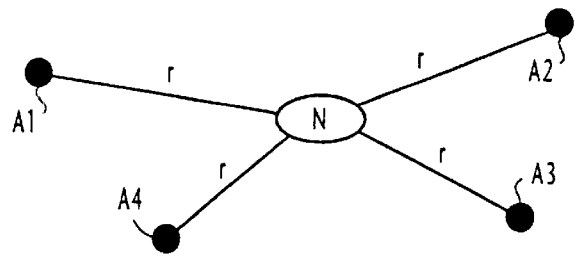
Figure 16D:
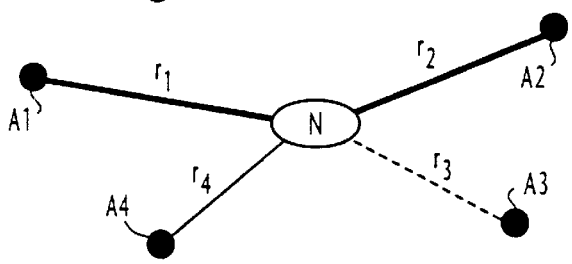

At step 305, the border nodes are organized into a symmetric star network topology 161 with spokes emanating from the nucleus N to the ports A1 to A4 as shown in FIG. 16B. At step 306, aggregation parameters (or aggregation parameter vector) are determined for all spokes of the star topology according to equations (1), (2), (3) and (4) described above. Spokes of the star topology are aggregated, at step 307, according to the aggregation parameters so that an asymmetric star topology 162 is formed as shown in FIG. 16D. It is seen that the spoke from the nucleus to port A3 is aggregated into the spokes to ports A1 and A2 as indicated by the thick lines.

Figure 16E:
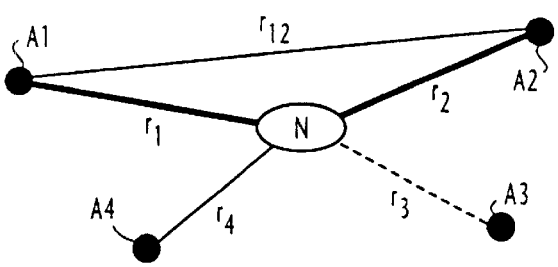

At step 308, the least link costs of the mesh topology are recalculated using the aggregation parameters and differences between the initial least link costs and the recalculated least link costs are determined (step 309). The maximum value of the differences is detected and compared with a convergence threshold (step 310). If it is not smaller than the convergence threshold, flow proceeds to step 311 to select a link having the maximum difference value and connect it as a bypass link $r_{12}$ between ports A1 and A2 to form a star topology 163 as illustrated in FIG. 16E. Aggregation parameters and least link costs of the star topology 163 are recalculated at step 312. At step 313, the number of bypass links established in the star topology is compared with a defined maximum number. If it is not greater than the maximum number, flow returns to step 309 to repeat the convergence process again.

If it is determined, at step 310, that the differences detected at step 309 are smaller than the convergence threshold or that the number of established bypass links is greater than the maximum number, flow proceeds to step 314.

Figure 16F:
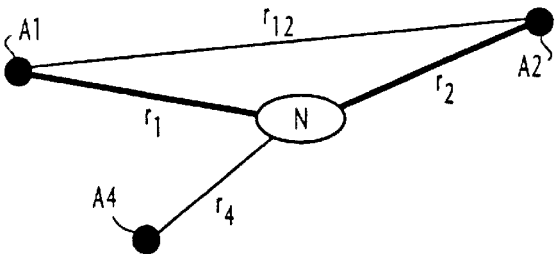
Figure 18:
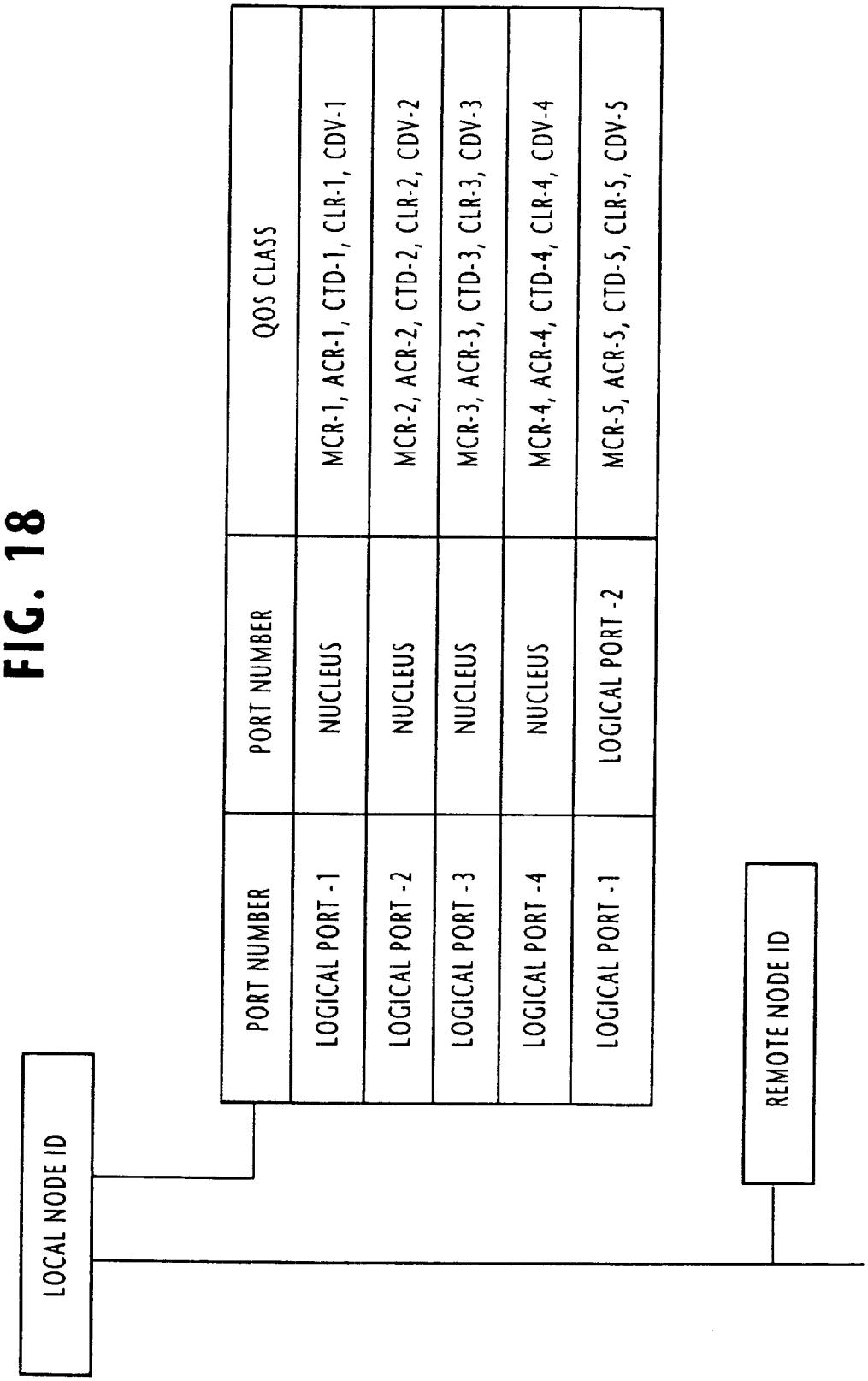
FIG. 18 is an illustration of logical port numbers mapped to various QOS parameters in the parent peer group resource database.

At step 314, the topology aggregation unit 207 looks up the memory 202 and determines whether physical links attached to border nodes of the parent peer group are aggregated. If the decision at step 314 yields a negative answer, flow proceeds to step 317 to save the resource data of the star topology in a parent peer group resource database 205. If physical links P4 between child peer groups B and C have been aggregated into the logical link L4 in the parent peer group D as shown in FIG. 13, the decision at step 314 is affirmative and flow proceeds to step 315 to remove the corresponding port, such as A3, from the star topology 163, forming a star topology 164 as illustrated in FIG. 16F. Flow proceeds to step 316 to calculate the QOS values of the links of the star topology 164 to form resource data. At step 317, the resource data of the star topology is saved in the parent peer group resource database 205, and flow advances to the end point of the routine. One example of the aggregated topology data stored in database 205 is shown in FIG. 18.

Reverting to FIG. 14, the controller 150 includes an aggregation/convergence parameter negotiation unit 208 connected to the ATM switch 140. Aggregation/convergence parameter negotiation units 208 of two immediate logical nodes exchange convergence parameters such as maximum number of bypass links to be provided in a logical peer group and a convergence threshold value to be used in the convergence process described with reference to FIG. 17. Aggregation parameters "r" are exchanged between two nodes in a manner similar to that described in the previous embodiments to determine the aggregation parameter at a point anywhere between aggressive and conservative values. Negotiation unit 208 hands over the negotiated aggregation parameter and convergence parameters to the topology aggregation unit 207, where they are used in the routine of FIG. 17.

Figure 19:
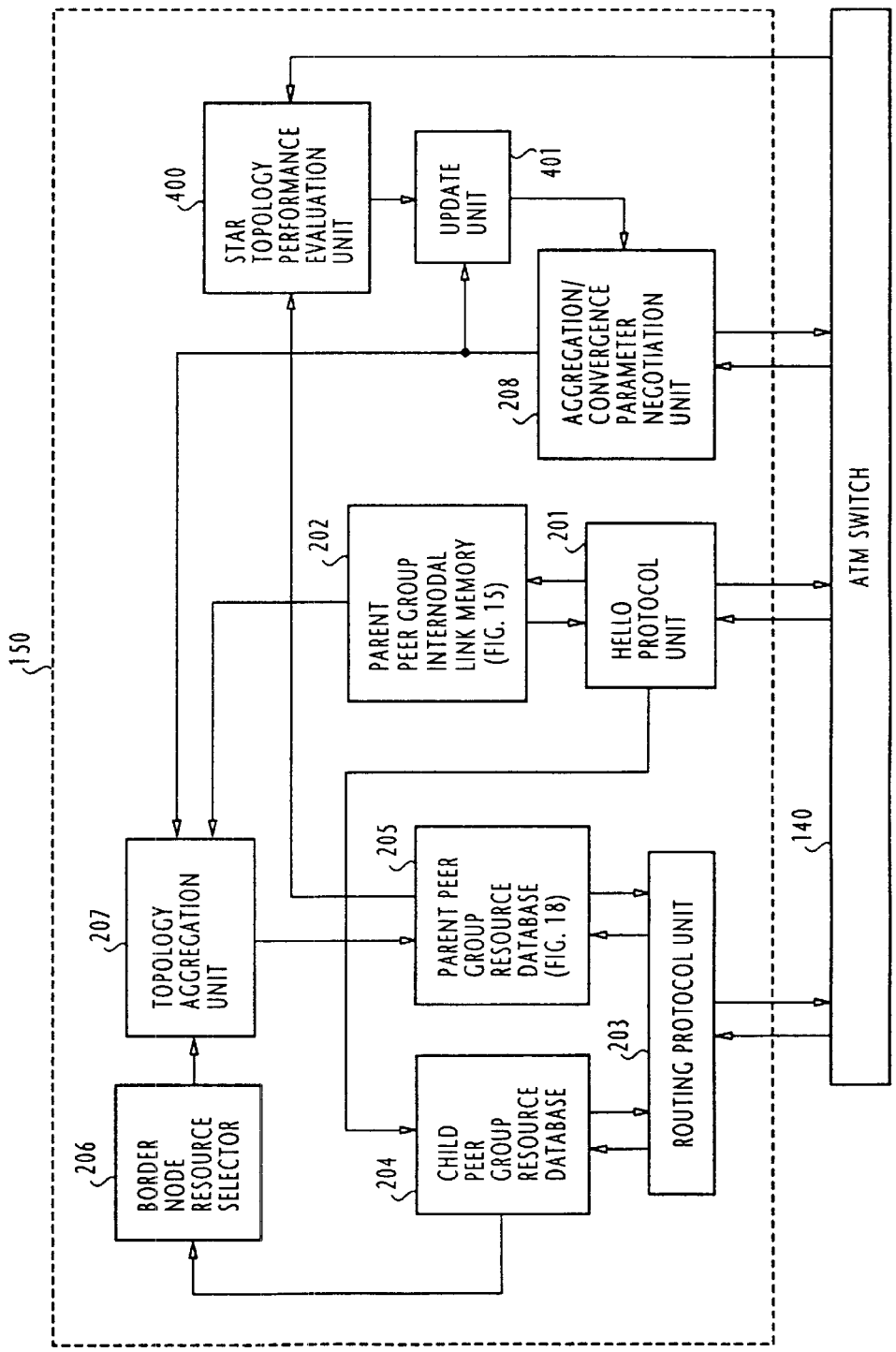
FIG. 19 is a block diagram of a modification of the peer group leader node of FIG. 14.

As shown in FIG. 19, the controller 150 may be further provided with a star topology performance evaluation unit 400 and an update unit 401. Star topology performance evaluation unit 400 is connected to the ATM switch 140 to collect traffic data from the network at regular intervals. Evaluation unit 400 is further connected to the parent peer group resource database 205 to use its topology data (FIG. 18) to identify the traffic data of the aggregated topology of the parent peer group and calculates the call setup failure ratio and network utilization efficiency of all physical links of the parent peer group to evaluate its performance. The evaluation data may also be obtained by the peer group leader by having the member nodes of its parent peer group calculate their call setup failure ratio and network utilization efficiency of all of their physical links at regular intervals and collecting them from the member nodes. If an aggregation parameter is appropriate, it is possible to maintain the utilization efficiency at 1 (full utilization) and the call setup failure ratio at a low value. The values of call setup failure ratio and utilization efficiency of the parent peer group are applied to the update unit 401. Based on the evaluated performance of the star topology, the update unit 401 determines whether the calculated values of call setup failure rate and network efficiency meet specified values and updates the aggregation parameter and/or convergence parameters according to this determination and sets the updated parameter into the aggregation/convergence parameter negotiation unit 209. For example, if the call setup failure ratio is higher than the specified value, the aggregation parameters may be decremented or the convergence threshold is incremented to increase the precision of approximation of the topology aggregation. If the network utilization efficiency is lower than the specified value, the aggregation parameters are incremented. Negotiation unit 208 exchanges the updated parameters with immediate neighbor nodes to agree on negotiated values and hands them over to the topology aggregation unit 207, which then performs the routine of FIG. 17 to produce new star topology data and use it to update the contents of the parent peer group resource database 205. Routing protocol unit 203 exchanges the data stored in databases 204 and 205 with all logical nodes and updates the contents of databases 204 and 205. These updates will be reflected in the call setup failure rate and network utilization efficiency of the logical topology and detected again by the evaluation unit 400 to repeat the process to optimize the topology aggregation.

Note that the link aggregation process of the embodiments of FIGS. 1, 7, 9 and 12 can also be used in the embodiments of FIGS. 14 and 19 to aggregate multiple physical links. In addition, the items of performance to be evaluated for optimization may include the rate of crankback messages since the high aggregation parameter causes an increase in the rate of the crankback messages.

What is claimed is:

1. A network node for a communication network in which said node is one of a plurality of network nodes, the network node comprising:

negotiating means for exchanging aggregation parameters with a neighbor node to agree on a negotiated aggregation parameter;

link aggregating means for aggregating a plurality of physical links between the network node and a neighbor node into a logical link according to the negotiated aggregation parameter;

a database for storing resource data of said logical link; and means for exchanging the resource data with said neighbor node and updating contents of said database with resource data of said neighbor node.

2. The network node of claim 1, wherein said plurality of network nodes are divided into a plurality of peer groups, and said neighbor node shares one of said peer groups in common with said network node.

3. The network node of claim 1, wherein each of said physical links is represented by a resource vector and each element of the vector is represented by a resource value of a different resource class, and wherein said logical link is represented by a resource vector and each element of the vector is represented by a sum of a maximum resource value, multiplied by the aggregation parameter, of the elements of the resource vectors of the physical links and a minimum resource value, multiplied by unity minus the aggregation parameter, of the elements of the resource vectors of the physical links.

4. The network node of claim 1, wherein each of said physical links is represented by a resource vector and each element of the vector is represented by a quality-of-service value of a different class, and wherein said logical link is represented by a resource vector and each element of the vector is represented by a sum of a maximum quality-of-service value, multiplied by the aggregation parameter, of the elements of the resource vectors of the physical links and a minimum quality-of-service value, multiplied by unity minus the aggregation parameter, of the elements of the resource vectors of the physical links.

5. The network node of claim 1, further comprising:

link performance evaluation means for evaluating an operating performance of said logical link by using traffic data from the network; and update means for updating the negotiated aggregation parameter according to the detected operating performance, said negotiating means exchanging the updated aggregation parameter with said neighbor node to agree on a negotiated aggregation parameter, said link aggregating means aggregating said physical links into a logical link according to the negotiated aggregation parameter and storing resource data of the logical link into said database.

6. The network node of claim 1, further comprising means for organizing said physical links into a plurality of groups according to similarities of resource classes of said physical links, said aggregating means aggregating the physical links of each of said groups into a logical link according to the negotiated aggregation parameter and storing resource data of the logical link into said database.

7. The network node of claim 6, further comprising:

link group performance evaluation means for detecting an operating performance of each of said groups of physical links; and update means for updating the negotiated aggregation parameter according to the detected operating performance, said negotiating means exchanging the updated aggregation parameter with said neighbor node to agree on a negotiated updated aggregation parameter, said link aggregating means aggregating said physical links of each of said groups into a logical link according to the negotiated updated aggregation parameter and storing resource data representing the logical link into said database.

8. A peer group leader node of a peer group in a communication network in which a plurality of interconnected nodes are divided into a plurality of peer groups, each peer group having border nodes via which the peer group is interconnected with other peer groups, comprising:

negotiating means for exchanging aggregation parameters with other peer group leader nodes to agree on negotiated aggregation parameters;

topology aggregating means for aggregating physical topology of the border nodes of said peer group into a logical star topology using said negotiated aggregation parameters;

a database for storing resource data of said logical star topology; and routing means for exchanging the resource data with a neighbor peer group leader node and updating the database with resource data from the neighbor peer group leader node.

9. The peer group leader node of claim 8, further comprising:

star topology performance evaluation means for evaluating an operating performance of the star topology by using traffic data from the network;

update means for updating the negotiated aggregation parameters according to the evaluated operating performance, said negotiating means exchanging the updated aggregation parameters with other peer group leader nodes to agree on negotiated updated aggregation parameters, said topology aggregating means aggregating said physical topology using the negotiated updated aggregation parameters.

10. The peer group leader node of claim 8, wherein said topology aggregating means is arranged to:

a) organize the border nodes of the peer group into a predetermined topology, b) calculate initial least costs of links of the topology, c) organize said border nodes into a star topology in which the border nodes are represented as a nucleus and ports, d) determine aggregation parameters for links of the star topology using said initial least costs, e) recalculate second least costs of said predetermined topology using the aggregation parameters, f) aggregate physical links between said nucleus and said ports into logical links according to said aggregation parameter, g) determine a plurality of differences between the initial least costs and the second least costs, h) determine a link having a maximum value of said differences if said maximum value is greater than a convergence threshold value, and i) interconnect adjacent ones of said ports with said link bypassing the nucleus.

11. The peer group leader node of claim 10, wherein said predetermined topology is a mesh topology.

12. The peer group leader node of claim 8, wherein said topology aggregating means is arranged to:

aggregate physical links between two peer groups into a logical link; and remove one of said ports from the star topology corresponding to one of said physical links.

13. The peer group leader node of claim 10, wherein said negotiating means is further arranged to exchange the convergence threshold value with other peer group leader nodes to agree on a negotiated convergence threshold value, said topology aggregating means determining said link having a maximum value of said differences if said maximum value is greater than the negotiated convergence threshold value.

14. A communication network comprising:

a plurality of network nodes organized into a plurality of interconnected peer groups, each of said peer groups having a peer group leader node and a plurality of border nodes through which the at least one peer group is connected to other peer groups;

each network node comprising:

negotiating means for exchanging aggregation parameters with a neighbor node of the same peer group to agree on a negotiated aggregation parameter;

link aggregating means for aggregating a plurality of physical links between the network node and a neighbor node into a logical link according to the negotiated aggregation parameter;

a database for storing resource data of said logical link; and means for exchanging the resource data with said neighbor node and updating contents of said database with resource data of said neighbor node, each group leader node comprising:

negotiating means for exchanging aggregation parameters with other peer group leader nodes to agree on negotiated aggregation parameters;

topology aggregating means for aggregating physical topology of the border nodes of said peer group into a logical star topology using said negotiated aggregation parameters;

a database for storing resource data of said logical star topology; and routing means for exchanging the resource data with a neighbor peer group leader node and updating the database with resource data from the neighbor peer group leader node.

15. The communication network of claim 14, wherein said plurality of network nodes are divided into a plurality of peer groups, and said neighbor node shares one of said peer groups in common with said network node.

16. The communication network of claim 14, wherein each of said physical links is represented by a resource vector and each element of the vector is represented by a resource value of a different resource class, and wherein said logical link is represented by a resource vector and each element of the vector is represented by a sum of a maximum resource value, multiplied by the aggregation parameter, of the elements of the resource vectors of the physical links and a minimum resource value, multiplied by unity minus the aggregation parameter, of the elements of the resource vectors of the physical links.

17. The communication network of claim 14, wherein each of said physical links is represented by a resource vector and each element of the vector is represented by a quality-of-service value of a different class, and wherein said logical link is represented by a resource vector and each element of the vector is represented by a sum of a maximum quality-of-service value, multiplied by the aggregation parameter, of the elements of the resource vectors of the physical links and a minimum quality-of-service value, multiplied by unity minus the aggregation parameter, of the elements of the resource vectors of the physical links.

18. The communication network of claim 14, further comprising:
    link performance evaluation means for evaluating an operating performance of said logical link by using traffic data from the network; and
    update means for updating the negotiated aggregation parameter according to the detected operating performance,
    said negotiating means exchanging the updated aggregation parameter with said neighbor node to agree on a negotiated aggregation parameter,
    said link aggregating means aggregating said physical links into a logical link according to the negotiated aggregation parameter and storing resource data of the logical link into said database.

19. The communication network of claim 14, further comprising means for organizing said physical links into a plurality of groups according to similarities of resource classes of said physical links,
    said aggregating means aggregating the physical links of each of said groups into a logical link according to the negotiated aggregation parameter and storing resource data of the logical link into said database.

20. The communication network of claim 19, further comprising:
    link group performance evaluation means for detecting an operating performance of each of said groups of physical links; and
    update means for updating the negotiated aggregation parameter according to the detected operating performance,
    said negotiating means exchanging the updated aggregation parameter with said neighbor node to agree on a negotiated updated aggregation parameter,
    said link aggregating means aggregating said physical links of each of said groups into a logical link according to the negotiated updated aggregation parameter and storing resource data representing the logical link into said database.

21. The communication network of claim 14, further comprising:

star topology performance evaluation means for evaluating an operating performance of the star topology by using traffic data from the network;
update means for updating the negotiated aggregation parameters according to the evaluated operating performance,
said negotiating means exchanging the updated aggregation parameters with other peer group leader nodes to agree on negotiated updated aggregation parameters,
said topology aggregating means aggregating said physical topology using the negotiated updated aggregation parameters.

22. The communication network of claim 14, wherein said topology aggregating means is arranged to:
    a) organize the border nodes of the peer group into a predetermined topology,
    b) calculate initial least costs of links of the topology,
    c) organize said border nodes into a star topology in which the border nodes are represented as a nucleus and ports,
    d) determine aggregation parameters for links of the star topology using said initial least costs,
    e) recalculate second least costs of said predetermined topology using the aggregation parameters,
    f) aggregate physical links between said nucleus and said ports into logical links according to said aggregation parameter,
    g) determine a plurality of differences between the initial least costs and the second least costs,
    h) determine a link having a maximum value of said differences if said maximum value is greater than a convergence threshold value, and
    i) interconnect adjacent ones of said ports with said link bypassing the nucleus.

23. The communication network of claim 22, wherein said predetermined topology is a mesh topology.

24. The communication network of claim 14, wherein said topology aggregating means is arranged to:
    aggregate physical links between two peer groups into a logical link; and
    remove one of said ports from the star topology corresponding to one of said physical links.

25. The communication network of claim 22, wherein said negotiating means is further arranged to exchange the convergence threshold value with other peer group leader nodes to agree on a negotiated convergence threshold value,
    said topology aggregating means determining said link having a maximum value of said differences if said maximum value is greater than the negotiated convergence threshold value.

26. An aggregation method for each of a plurality of nodes of a communication network, the method comprising the steps of:
    a) exchanging aggregation parameters with a neighbor node to agree on a negotiated aggregation parameter;
    b) aggregating a plurality of physical links from the node to the neighbor node into a logical link according to the negotiated aggregation parameter and storing resource data of said logical link into a database; and
    c) exchanging the resource data with said neighbor node and updating contents of said database with resource data of said neighbor node.

27. The method of claim 26, wherein each of said physical links is represented by a resource vector and each element of the vector is represented by a resource value of a different resource class, wherein the step (b) comprises the steps of:

b₁) detecting a maximum resource value and a minimum resource value of an element of the resource vectors of the physical links;

b₂) multiplying the maximum resource value by the aggregation parameter and multiplying the minimum resource value by unity minus the aggregation parameter; and b₃) summing the multiplied maximum resource value and the multiplied minimum resource value; and b₄) repeating the steps (b₁) to (b₃) for each successive element of the resource vectors of the physical links.

28. The method of claim 26, wherein each of said physical links is represented by a resource vector and each element of the vector is represented by a quality-of-service value of a different class, wherein the step (b) comprises the steps of:

b₁) detecting a maximum quality-of-service value and a minimum quality-of-service value of an element of the resource vectors of the physical links;

b₂) multiplying the maximum quality-of-service value by the aggregation parameter and multiplying the minimum quality-of-service value by unity minus the aggregation parameter; and b₃) summing the multiplied maximum quality-of-service value and the multiplied minimum quality-of-service value; and b₄) repeating the steps (b₁) to (b₃) for each successive element of the resource vectors of the physical links.

29. An aggregation method for each of a plurality of nodes of a communication network, the method comprising the steps of:

a) exchanging aggregation parameters with a neighbor node to agree on a negotiated aggregation parameter;

b) aggregating a plurality of physical links from the node to the neighbor node into a logical link according to the negotiated aggregation parameter and storing resource data of said logical link into a database;

c) exchanging the resource data with said neighbor node and updating contents of said database with resource data of said neighbor node;

d) evaluating an operating performance of said logical link by using traffic data from the network;

e) updating the negotiated aggregation parameter according to the detected operating performance;

f) exchanging the updated aggregation parameter with said neighbor node to agree on a negotiated aggregation parameter; and g) repeating the steps (b) to (f) using the negotiated aggregation parameter.

30. An aggregation method for each of a plurality of nodes of a communication network, the method comprising the steps of:

a) organizing a plurality of physical links between the node and a neighbor node into a plurality of groups according to similarities of resource classes of said physical links;

b) exchanging an aggregation parameter with the neighbor node to agree on a negotiated aggregation parameter;

c) aggregating said physical links into a plurality of said groups of logical links using the negotiated aggregation parameter and storing resource data of said logical link into a database; and d) exchanging the resource data with said neighbor node and updating contents of said database with resource data of said neighbor node.

31. An aggregation method for each of a plurality of nodes of a communication network, the method comprising the steps of:

a) organizing a plurality of physical links between the node and a neighbor node into a plurality of groups according to similarities of resource classes of said physical links;

b) exchanging an aggregation parameter with the neighbor node to agree on a negotiated aggregation parameter;

c) aggregating said physical links into a plurality of said groups of logical links using the negotiated aggregation parameter and storing resource data of said logical link into a database;

d) exchanging the resource data with said neighbor node and updating contents of said database with resource data of said neighbor node;

e) evaluating an operating performance of each of said groups of physical links from traffic data from the network;

f) updating the negotiated aggregation parameter according to the evaluated operating performance; and g) repeating the steps (b) to (e) using the updated aggregation parameter as said aggregation parameter.

32. An aggregation method for a peer group leader node in a communication network formed by a plurality of interconnected nodes which are divided into a plurality of peer groups, each peer group having said peer group leader node and border nodes via which the peer group is interconnected with other peer groups, the method comprising the steps of:

a) exchanging aggregation parameters with other peer group leader nodes to agree on negotiated aggregation parameters;

b) aggregating physical topology of the border nodes of said peer group into a logical star topology using said negotiated aggregation parameters and storing resource data of said logical star topology in a database; and c) exchanging the resource data with a neighbor peer group leader node and updating the database with resource data from the neighbor peer group leader node.

33. The method of claim 32, wherein the step (b) comprises the steps of:

b₁) organizing the border nodes of said peer group into a predetermined topology;

b₂) calculating initial least costs of links of the topology;

b₃) organizing said border nodes into a star topology in which the border nodes are represented as a nucleus and ports;

b₄) determining aggregation parameters for links of the star topology using said initial least costs;

b₅) recalculating second least costs of said predetermined topology using the aggregation parameters;

b₆) aggregating physical links from said nucleus to said ports into logical links according to said aggregation parameter;

b₇) determining a plurality of differences between the initial least costs and the second least costs;

b₈) determining a link having a maximum value of said differences if said maximum value is greater than a convergence threshold value; and b₉) interconnecting adjacent ones of said ports with the link bypassing the nucleus.

34. The method of claim 33, wherein said predetermined topology is a mesh topology.

35. The method of claim 33, further comprising the steps of:

aggregating physical links between two peer groups into a logical link; and removing one of said ports of step ($b_9$) corresponding to one of said physical links.

36. The method of claim 33, further comprising the steps of:

following the step ($b_9$), recalculating the aggregation parameters and said second least costs of the links of the predetermined topology; and repeating the steps ($b_7$) to ($b_9$) until said maximum value becomes smaller than said convergence threshold value.

37. The method of claim 32, further comprising the steps of:

evaluating an operating performance of the logical star topology by using traffic data from the network;

updating the negotiated aggregation parameters of the step (a) according to the evaluated operating performance; and repeating the steps (b) and (c).

38. The method of claim 33, further comprising the steps of:

evaluating an operating performance of the logical star topology by using traffic data from the network;

updating the negotiated aggregation parameters of the step (a) according to the evaluated operating performance;

exchanging the negotiated updated aggregation parameters with other peer group leader nodes to agree on negotiated updated aggregation; and repeating the steps ($b_5$) to ($b_9$).

39. A network node for a communication network in which said node is one of a plurality of network nodes, the network node comprising:

negotiating means for exchanging aggregation parameters with a neighbor node to agree on a negotiated aggregation parameter, said negotiated aggregation parameter having a value between 0 and 1 inclusive;

link aggregating means for aggregating a plurality of physical links between the network node and a neighbor node into a logical link according to the negotiated aggregation parameter;

a database for storing resource data of said logical link; and means for exchanging the resource data with said neighbor node and updating contents of said database with resource data of said neighbor node.

* * * * *